(12) United States Patent
Kim et al.

(10) Patent No.: US 7,173,990 B2
(45) Date of Patent: Feb. 6, 2007

(54) JOINT EQUALIZATION, SOFT-DEMAPPING AND PHASE ERROR CORRECTION IN WIRELESS SYSTEM WITH RECEIVE DIVERSITY

(75) Inventors: Younggyun Kim, Irvine, CA (US); Farshid R Rad, Minneapolis, MN (US); Barrett J Brickner, Savage, MN (US); Jaekyun Moon, Plymouth, MN (US)

(73) Assignee: DSP Group Inc., Santa Clara, CA (US)

( * ) Notice: Subject to any disclaimer, the term of this patent is extended or adjusted under 35 U.S.C. 154(b) by 953 days.

(21) Appl. No.: 10/141,628

(22) Filed: May 6, 2002

(65) Prior Publication Data

US 2003/0123582 A1   Jul. 3, 2003

Related U.S. Application Data

(60) Provisional application No. 60/344,012, filed on Dec. 27, 2001.

(51) Int. Cl.
*H04L 1/02* (2006.01)
*H04L 5/12* (2006.01)
(52) U.S. Cl. ...................... 375/347; 375/267
(58) Field of Classification Search ............... 375/371, 375/347, 340–341, 267; 370/208, 329; 714/795
See application file for complete search history.

(56) References Cited

U.S. PATENT DOCUMENTS

| 5,732,113 | A | 3/1998 | Schmidl et al. |
| 6,144,711 | A | 11/2000 | Raleigh et al. |
| 6,188,717 | B1 * | 2/2001 | Kaiser et al. ............... 375/148 |
| 6,219,334 | B1 | 4/2001 | Sato et al. |
| 6,289,000 | B1 | 9/2001 | Yonge, III |
| 6,304,750 | B1 | 10/2001 | Rashid-Farrokhi et al. |
| 6,320,903 | B1 | 11/2001 | Isaksson et al. |
| 6,327,316 | B1 | 12/2001 | Ikeda |
| 6,449,245 | B1 * | 9/2002 | Ikeda et al. ................. 370/208 |
| 6,473,467 | B1 * | 10/2002 | Wallace et al. ............. 375/267 |
| 6,647,015 | B2 * | 11/2003 | Malkemes et al. .......... 370/401 |
| 6,654,340 | B1 * | 11/2003 | Jones et al. ................. 370/208 |
| 6,754,170 | B1 * | 6/2004 | Ward .......................... 370/208 |
| 6,907,084 | B2 * | 6/2005 | Jeong ......................... 375/261 |

(Continued)

FOREIGN PATENT DOCUMENTS

KR   1999-0058954   7/1999

OTHER PUBLICATIONS

"Wide-Band Orthogonal Frequency Multiplexing (W-OFDM)" Wi-Lan, Inc., Sep. 2000.

(Continued)

*Primary Examiner*—Emmanuel Bayard
*Assistant Examiner*—Lawrence Williams
(74) *Attorney, Agent, or Firm*—Shumaker & Sieffert, P.A.

(57) ABSTRACT

A wireless communication technique enables equalization, soft demapping and phase error estimation functions to be performed jointly based on multiple observations of a transmitted symbol in wireless communication systems employing receive diversity. Multiple observations of a symbol are obtained from multiple antenna paths in a wireless receiver. Equalization, soft demapping and phase error estimation functions can be integrated within shared hardware, rather than distributed among separate hardware blocks, promoting reduced size, complexity and cost in a wireless receiver.

128 Claims, 15 Drawing Sheets

U.S. PATENT DOCUMENTS

| | | | | |
|---|---|---|---|---|
| 6,937,558 | B2* | 8/2005 | Wakutsu | 370/208 |
| 6,952,458 | B1* | 10/2005 | Djokovich et al. | 375/341 |
| 7,006,848 | B2* | 2/2006 | Ling et al. | 455/562.1 |
| 2003/0104797 | A1* | 6/2003 | Webster et al. | 455/296 |
| 2005/0254461 | A1* | 11/2005 | Shin et al. | 370/329 |
| 2006/0029162 | A1* | 2/2006 | Chi | 375/340 |

OTHER PUBLICATIONS

"Multicarrier and OFDM Basics" http://www.stanford.edu/~gaertner/projects/ee359/basics.html, Apr. 25, 2002.

"Retraining WLAN Receivers for OFDM Operation" Ivan Greenburg, www.CommsDesign.com/design_center/homenetworking/design_corner/OEG20020115S0056, Jan. 15, 2002.

"Modulation and Coding" Chapter 3, OFDM Wireless LANs: A Theoretical and Practical Guide 1/e, Juha Heiskala and John Terry, Ph.D., Published Dec. 2001 by Sams.

"Basics of Orthogonal Frequency Divison Multiplexing (OFDM)" Greg DesBrisay, Cisco Systems, Inc., 2000.

"Simplified Channel Estimation for OFDM Systems with Multiple Transmit Antennas" Ye (Geoffrey) Li, IEEE Transactions on Wireless Communications, vol. 1, No. 1, Jan. 2002.

"New Equalization Approach for OFDM over Dispersive and Rapidly Time Varying Channel" Jean-Paul M.G. Linnartz and Alexei Gorokhov, PIMRC '00, London. Sep. 2000, CD-ROM proceedings.

Preliminary Office Action dated Apr. 26, 2006 from the corresponding Korean Patent Application Serial No. 10-2004-7010181 (6 pages).

International Seach Report from corresponding PCT Application Serial No. PCT/US02/37532 mailed Feb. 4, 2003 (4 pages).

International Preliminary Examination Report from corresponding PCT Application Serial No. PCT/US02/37532 mailed Jul. 23, 2003 (4 pages).

* cited by examiner

JOINT EQUALIZATION, SOFT-DEMAPPING AND PHASE ERROR CORRECTION IN WIRELESS SYSTEM WITH RECEIVE DIVERSITY

This application claims priority from U.S. provisional application Ser. No. 60/344,012, filed Dec. 27, 2001, the entire content of which is incorporated herein by reference.

FIELD

The invention relates to wireless communication and, more particularly, to techniques for demodulation of wireless signals transmitted in a wireless communication system.

BACKGROUND

Wireless communication involves transmission of encoded information on a modulated radio frequency (RF) carrier signal. A wireless receiver includes an RF antenna that receives a wireless signal, and a demodulator that converts the RF signal to a baseband. In a multi-carrier wireless communication system, such as an orthogonal frequency division multiplexing (OFDM) system, transmitted signals are susceptible to multi-path scattering and reflection, which can cause interference between information transmitted on different symbols. For this reason, the receiver typically includes a channel estimator that measures fluctuation of the channel response. The receiver uses the measured channel response to adjust the incoming signals, and compensate for channel effects that could cause interference.

The receiver demodulates the communication signal using an oscillator that operates independently of the transmitter carrier frequency. The receiver periodically samples the received analog carrier signal, and extracts a communication signal using digital signal processing techniques. Differences between the carrier frequency and the demodulation frequency of the receiver may contribute phase rotation to the frequency domain signal. This frequency error produces a phase shift that increases as time progresses, and can be accompanied by additive phase noise. Accordingly, the receiver also may perform phase error estimation and correction to improve decoding accuracy.

Encoding techniques such as quadrature amplitude modulation (QAM) involve mapping of a finite number of bits to each transmitted symbol to encode information in the wireless signal. To decode the information, the receiver demaps the symbols, typically using a soft demapping algorithm. A soft decision for a given bit can be obtained using a log likelihood ratio. The soft decisions are used to calculate branch metrics for a convolutional decoder such as a Viterbi decoder.

Equalization, soft demapping and phase error estimation represent some of the features that contribute to the size, complexity and cost of a wireless receiver. Such features ordinarily are necessary in a wireless communication system, however, to ensure effective communication of desired information.

SUMMARY

The invention is directed to wireless communication techniques that enable equalization, soft demapping and phase error estimation functions to be performed jointly based on multiple observations of a transmitted symbol in wireless communication systems employing receive diversity. Multiple observations of a transmitted symbol are obtained from multiple antenna paths in a wireless receiver. The invention enables the equalization, soft demapping and phase error estimation functions to be integrated within shared hardware, rather than distributed among separate hardware blocks. In this manner, the invention can reduce the size, complexity and cost of a wireless receiver.

The invention may be applied, for example, to a multi-carrier (MC) wireless communication system, such as an OFDM system. In an OFDM system, a number of QAM symbols are transmitted in parallel in the time-domain via inverse Fourier transformation. The invention may enable equalization, soft demapping and phase error estimation functions to be performed jointly for multiple observations of a transmitted symbol transmitted in an OFDM wireless communication system employing receive diversity. The multiple observations of a transmitted symbol are the outputs of Fourier transformers that are applied to the multiple antenna paths in the OFDM wireless receiver. In the OFDM example, symbol observations can be obtained from fast Fourier transform (FFT) outputs.

In one embodiment, the invention provides a method comprising receiving wireless signals via one or more antennas, demodulating the wireless signals to produce observations of a transmitted symbol, weighting each of the observations with a complex conjugate of an estimated channel response for the corresponding antenna, combining the weighted observations to form a combined observation, and generating one or more soft decision bits indicative of the transmitted symbol for the combined observation according to soft demapping rules based on a subset of the transmitted symbol constellation.

In another embodiment, the invention provides a method comprising receiving wireless signals via one or more antennas, demodulating the wireless signals to produce observations of a transmitted symbol, weighting each of the observations with a complex conjugate of an estimated channel response for the corresponding antenna, combining the weighted observations to form a combined observation, generating one or more soft decision bits indicative of the transmitted symbol for the combined observation according to soft demapping rules based on a subset of the transmitted symbol constellation, and estimating the phase error using the soft decision bits.

In another embodiment, the invention provides a wireless receiver comprising one or more antennas that receive wireless signals, a demodulator that demodulates the wireless signals to produce observations of a transmitted symbol, an equalizer that weights each of the observations with a complex conjugate of an estimated channel response for the corresponding antenna, a soft demapper unit that combines the weighted observations to form a combined observation, and generates one or more soft decision bits indicative of the transmitted symbol for the combined observation according to soft demapping rules based on a subset of the transmitted symbol constellation.

In another embodiment, the invention provides a wireless receiver comprising one or more antennas that receive wireless signals, a demodulator that demodulates the wireless signals to produce observations of a transmitted symbol, an equalizer that weights each of the observations with a complex conjugate of an estimated channel response for the corresponding antenna, a soft demapper unit that combines the weighted observations to form a combined observation, and generates one or more soft decision bits indicative of the transmitted symbol for the combined observation according to soft demapping rules based on a subset of the transmitted symbol constellation, and an estimator the phase error using the soft decision bits.

In a further embodiment, the invention provides a method comprising receiving orthogonal frequency division multiplexing (OFDM) wireless signals via multiple antennas, demodulating the wireless signals to produce observations of a quadrature amplitude modulation (QAM) symbol, combining the observations to form a combined observation, and generating one or more soft decision bits indicative of the QAM symbol for the combined observation according to piecewise linear soft demapping rules.

In another embodiment, the invention provides a method comprising receiving orthogonal frequency division multiplexing (OFDM) wireless signals via multiple antennas, demodulating the wireless signals to produce observations of a quadrature amplitude modulation (QAM) symbol, combining the observations to form a combined observation, and generating one or more soft decision bits indicative of the QAM symbol for the combined observation according to piecewise linear soft demapping rules, and estimating the phase error using the soft decision bits.

In an added embodiment, the invention provides a receiver comprising multiple antennas that receive orthogonal frequency division multiplexing (OFDM) wireless signals via multiple antennas, a demodulator that demodulates the wireless signals to produce observations of a quadrature amplitude modulation (QAM) symbol, a soft demapper unit that combines the observations to form a combined observation, and generates one or more soft decision bits indicative of the QAM symbol for the combined observation according to piecewise linear soft demapping rules.

In an added embodiment, the invention provides a receiver comprising multiple antennas that receive orthogonal frequency division multiplexing (OFDM) wireless signals via multiple antennas, a demodulator that demodulates the wireless signals to produce observations of a quadrature amplitude modulation (QAM) symbol, a soft demapper unit that combines the observations to form a combined observation, and generates one or more soft decision bits indicative of the QAM symbol for the combined observation according to piecewise linear soft demapping rules, and an estimator that estimates the phase error using the soft decision bits.

In another embodiment, the invention provides a method comprising applying a soft decision function to generate soft decision bits for a combined transmitted symbol observation produced from wireless signals received via multiple receive paths, wherein the soft decision function defines soft demapping rules based on a subset of the transmitted symbol constellation.

In a further embodiment, the invention provides receiver comprising a soft demapper unit that applies a soft decision function to generate soft decision bits for a combined QAM symbol produced from wireless signals received via multiple receive paths, wherein the soft decision function defines soft demapping rules based on a subset of the transmitted symbol constellation.

The invention may provide one or more advantages. The equalization, soft demapping and phase error estimation functions can be performed jointly within shared hardware. Accordingly, the invention promotes reduced size, complexity and cost of hardware components in a multi-carrier wireless receiver such as an OFDM wireless receiver. In addition, the invention promotes increased efficiency and accuracy in the demodulation of transmitted symbols in a wireless communication system. For example, the use of multiple receive paths permits increased signal-to-noise ratio in the detection of the transmitted symbol.

Additional details of various embodiments are set forth in the accompanying drawings and the description below. Other features, objects and advantages will become apparent from the description and drawings, and from the claims.

DETAILED DESCRIPTION

Figure 1:
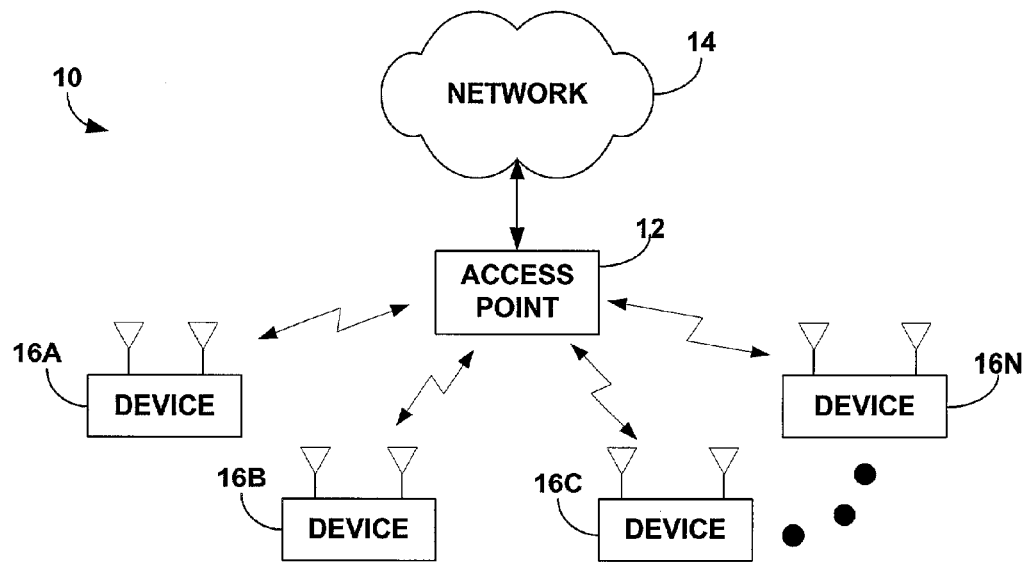
FIG. 1 is a block diagram illustrating a wireless communication network.

FIG. 1 is a block diagram illustrating a wireless communication network 10. Wireless communication network 10 may be configured for joint performance of equalization, soft demapping and phase error estimation functions. In particular, the equalization, soft demapping and phase error estimation functions may be applied to multiple observations of a transmitted symbol received via a receive diversity antenna arrangement. The transmitted symbol may be, for example, a QAM symbol. Wireless communication network 10 may be a multi-carrier wireless network such as, for example, an OFDM wireless network.

As shown in FIG. 1, wireless communication network 10 may include one or more wireless access points 12 coupled to a wired network 14, e.g., via an Ethernet connection. Wireless access point 12 permits wireless communication between wired network 14 and one or more wireless communication devices 16A–16N (hereinafter 16). Each wireless communication device 16, as well as wireless access point 12, may include two or more antennas that provide multiple receive paths for receive diversity, as will be described in further detail herein. Wireless access point 12 may integrate a hub, switch or router to serve multiple wireless communication devices 16. Wireless communication network 10 may be used to communicate data, voice, video and the like between devices 16 and network 14 according to a variety of different wireless transmission standards based on a multi-carrier communication technique such as OFDM.

Figure 2:
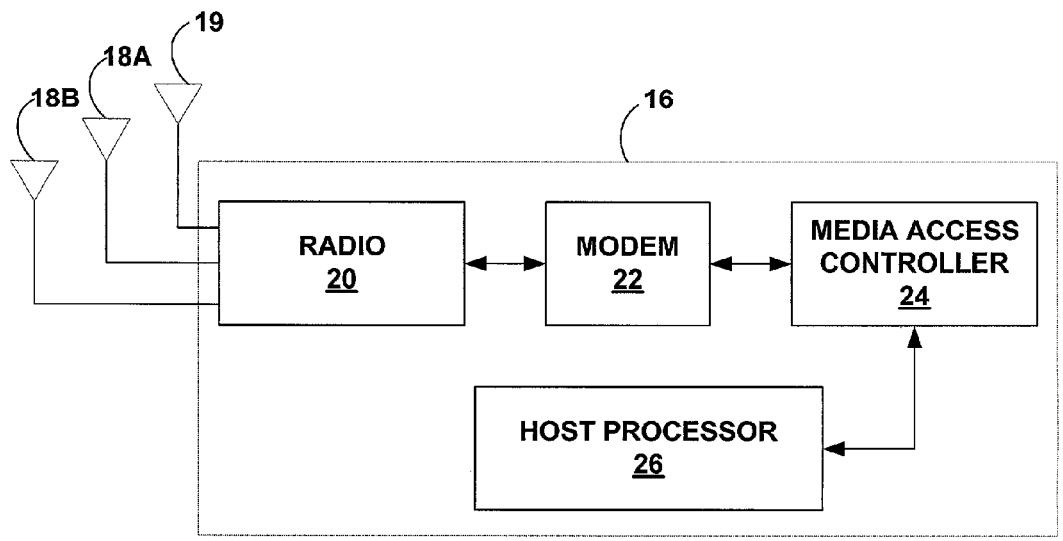
FIG. 2 is a block diagram illustrating a wireless communication device useful in the network of FIG. 1.

FIG. 2 is a block diagram illustrating a wireless communication device 16 in further detail. As shown in FIG. 2, wireless communication device 16 may include at least two RF antennas 18A, 18B (hereinafter 18), a radio 20, modem 22, and media access controller 24 coupled to a host processor 26. Radio 20 and modem 22 function together as a wireless receiver. Wireless communication device 16 may take the form of a variety of wireless equipment, such as computers, personal computer cards, e.g., PCI or PCMCIA cards, personal digital assistants (PDAs), network audio or video appliances, and the like.

RF antennas 18 receive RF signals over one or more receive paths. In one embodiment, RF antennas 18 receive RF signals over multiple receive paths. Antenna 18A provides a first receive path 18A, and antenna 18B provides a second receive path. More than two antennas 18 may be provided in some embodiments for enhanced receive diversity. One of antennas 18, or a different antenna 19, may be used for transmission of RF signals within network 10. Radio 20 may include circuitry for upconverting transmitted signals to RF, and downconverting RF signals to baseband. In this sense, radio 20 may integrate both transmit and receive circuitry within a single transceiver component. In some cases, however, transmit and receive circuitry may be formed by separate transmitter and receiver components. For purposes of illustration, discussion herein will be generally limited to the receiver and demodulation aspects of radio 20 and modem 22.

Modem 22 encodes information in a baseband signal for upconversion to the RF band by radio 20 and transmission via a transmit antenna. Similarly, and more pertinent to the invention, modem 22 decodes information from RF signals received via antennas 18 and downconverted to baseband by radio 20. As will be described, the RF signals received by multiple antennas 18A, 18B may be demodulated to produce observations of QAM symbols. The observations are combined to form a combined observation for processing by a soft demapping unit within modem 22 to produce the QAM symbol. Media access controller 24 interacts with host processor 26 to facilitate communication between modem 22 and a host wireless communication device 16, e.g., a computer, PDA or the like. Hence, host processor 26 may be a CPU within a computer or some other device. Radio 20, modem 22 and media access controller 24 may be integrated on a common integrated circuit chip, or realized by discrete components.

Wireless communication network 10 (FIG. 1) and wireless communication device 16 (FIG. 2) may conform to a wireless networking standard, such as the IEEE 802.11a standard. The IEEE 802.11a standard specifies a format for the radio frequency (RF) transmission of orthogonal frequency division multiplexed (OFDM) data. The OFDM symbols transmitted according to the IEEE 802.11a standard occupy a 20 MHz bandwidth, which is divided into 64 equally spaced frequency bands. Incorporation of multiple antennas 18 for receive diversity in an OFDM system, in accordance with the invention, can enhance the accuracy of signal demodulation and decoding. In addition, joint performance of equalization, soft demapping and phase error estimation for a observations obtained from multiple antenna receive paths may permit use of shared hardware, resulting in a wireless receiver having reduced cost, complexity and size.

Consider an OFDM wireless communication device 16, as shown in FIG. 2, with a single transmit antenna 19 and multiple receive antennas 18A, 18B, in accordance with the invention. In this example, every sub-carrier in each OFDM symbol received by wireless communication device 16 is modulated by a QAM symbol. Focusing on a particular OFDM symbol and a specific sub-carrier associated with the OFDM symbol, let $r_i$ be the corresponding demodulated observation sample, i.e., an equalized FFT output, associated with the ith receive antenna, assuming two or more receive antennas 18 for receive diversity.

Also, let $a_j$ denote the jth symbol in the applicable QAM constellation. A finite number of bits, e.g., $b_1 b_2 \ldots b_M$, are mapped to each QAM symbol. The soft decision associated with $b_l$, $1 \leq l \leq M$, can be obtained from the log likelihood ratio:

$$LLR(b_l) = \ln \frac{P(b_l = 1/R)}{P(b_l = 0/R)} \quad (1)$$

$$= \ln \sum_{a_i \in A(b_l=1)} \frac{P(a_i/R)}{\sum_{a_j \in A(b_l=0)} P(a_j/R)}$$

where $R = [r_1 \, r_2 \ldots r_L]'$ is the vector of observation samples corresponding to L multiple receive antennas and the summation in the numerator or denominator, as applicable, is taken over all QAM symbols that share the common bit $b_l=1$ ($b_l=0$). It is now shown that a reduced-complexity soft decision detector can be obtained by using only a subset of the symbol constellation in (1). As an example, assuming that the symbols are equally likely, the log likelihood can be rewritten as:

$$LLR(b_l) = \ln \sum_{a_i \in A(b_l=1)} \frac{p(R/a_i)}{\sum_{a_j \in A(b_l=0)} p(R/a_j)} \quad (2)$$

$$\approx \ln \frac{p(R/a_{\min 1})}{p(R/a_{\min 0})}$$

where $$a_{\min 1} = \arg\max_{a_i \in A(b_l=1)} p(R \mid a_i) \quad (3)$$

and $$a_{\min 0} = \arg\max_{a_i \in A(b_l=0)} p(R \mid a_i). \quad (4)$$

Assuming additive Gaussian noise, the expression can be rewritten as:

$$LLR(b_l) \approx -\frac{1}{2}R_1'C^{-1}R_1 + \frac{1}{2}R_0'C^{-1}R_0 \qquad (5)$$

where $$R_1 = \begin{bmatrix} r_1 - a_{\min 1} \\ r_2 - a_{\min 1} \\ \vdots \\ r_L - a_{\min 1} \end{bmatrix}, R_0 = \begin{bmatrix} r_1 - a_{\min 0} \\ r_2 - a_{\min 0} \\ \vdots \\ r_L - a_{\min 0} \end{bmatrix} \text{ and}$$

$$C = \begin{bmatrix} \sigma_1^2 & 0 & \cdots & 0 \\ 0 & \sigma_2^2 & \cdots & 0 \\ \vdots & \vdots & \ddots & \vdots \\ 0 & 0 & \cdots & \sigma_L^2 \end{bmatrix}.$$

The noise covariance matrix C is diagonal as the observations are assumed to be statistically independent. The variance $$\sigma_i^2$$

is the noise variance associated with the observation $r_i$. The expression (5) can be rewritten as:

$$LLR(b_l) \approx -\frac{1}{2}\sum_{i=1}^{L}\frac{1}{\sigma_i^2}|r_i - a_{\min 1}|^2 + \frac{1}{2}\sum_{i=1}^{L}\frac{1}{\sigma_i^2}|r_i - a_{\min 0}|^2. \qquad (6)$$

Letting $u_i$ and $H_i$ denote the unequalized FFT output sample and the channel response associated with the ith antenna, respectively, expression (6) can be rewritten as:

$$2\sigma_n^2 \cdot LLR(b_l) \approx -\sum_{i=1}^{L}|H_i|^2\left|\frac{u_i}{H_i} - a_{\min 1}\right|^2 + \qquad (7)$$

$$\sum_{i=1}^{L}|H_i|^2\left|\frac{u_i}{H_i} - a_{\min 0}\right|^2$$

$$= -\sum_{i=1}^{L}|u_i - a_{\min 1}H_i|^2 + \sum_{i=1}^{L}|u_i - a_{\min 0}H_i|^2$$

$$= \sum_{i=1}^{L}[2\cdot\text{Re}\{u_i a_{\min 1}^* H_i^*\} - |a_{\min 1}H_i|^2] -$$

$$\sum_{i=1}^{L}[2\cdot\text{Re}\{u_i a_{\min 0}^* H_i^*\} - |a_{\min 0}H_i|^2]$$

$$= 2\sum_{i=1}^{L}\text{Re}\{u_i(a_{\min 1} - a_{\min 0})^* H_i^*\} - \{|a_{\min 1}|^2 -$$

$$|a_{\min 0}|^2\}\sum_{i=1}^{L}|H_i|^2.$$

In expression (7), $u_i H_i$ has been substituted for $r_i$. In this manner, each observation is weighted with the complex-conjugate of the channel response $H_i$ for the corresponding antenna. Hence, by incorporation of the channel response $H_i$, equalization can be performed jointly with the soft-demapping function, as discussed in further detail below. Finally, the soft decision can be defined as the scaled log likelihood:

$$\Lambda(b_l) \equiv \frac{\sigma_n^2}{2}\cdot LLR(b_l) \qquad (8)$$

$$\approx \frac{1}{2}\sum_{i=1}^{L}\text{Re}\{u_i(a_{\min 1} - a_{\min 0})^* H_i^*\} - \frac{1}{4}\{|a_{\min 1}|^2 - |a_{\min 0}|^2\}$$

$$\sum_{i=1}^{L}|H_i|^2.$$

Note that, in expressions (7) and (8), computation of the log likelihood to generate a soft decision is based on the unequalized observation sample $u_i$. The frequency equalization, which is essentially an act of dividing $u_i$ by the channel response $H_i$ for the pertinent frequency bin, is implicit in expression (7) above. In this sense, expressions (7) and (8) represent a joint equalization and soft-demapping operation. In other words, equalization and soft-demapping can be performed jointly, rather than independently, using a common set of demapping functions that implicate equalization. Advantageously, this feature may enable the sharing of hardware and processing overhead, thereby reducing size, complexity and cost within the wireless receiver components of wireless communication device 16.

The branch metric in the soft Viterbi algorithm used for decoding can be obtained by simply summing the M consecutive soft decisions, after appropriate deinterleaving, as represented by the expression:

$$\lambda(b_1' b_2' \ldots b_M') = \sum_{l=1}^{M}\left(b_l' - \frac{1}{2}\right)\Lambda(b_l) \qquad (9)$$

where $b'_1$ represents deinterleaved bits. Note that arbitrary scaling of the log likelihood ratio does not affect the Viterbi decoding operation as long as the scaling is consistent over the entire bit sequence. This particular scaling of the log likelihood expression (8) may be chosen because it tends to simplify the final expression. In addition, the log likelihood (8) without the scaling may improve the dynamic range utilization in the finite precision implementation.

Figure 3:
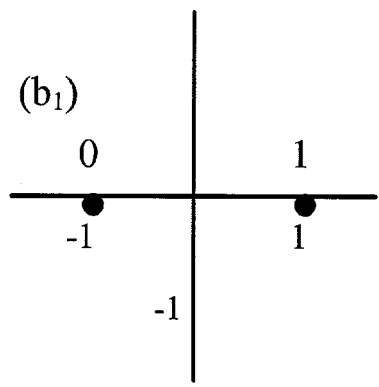
FIG. 3 is a block diagram illustrating a constellation of binary phase shift keying (BPSK) symbols.
Figure 4:
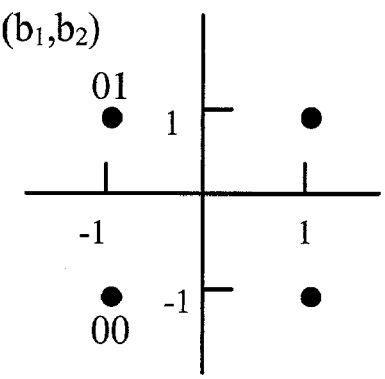
FIG. 4 is a block diagram illustrating a constellation of 4-QAM symbols.
Figure 5:
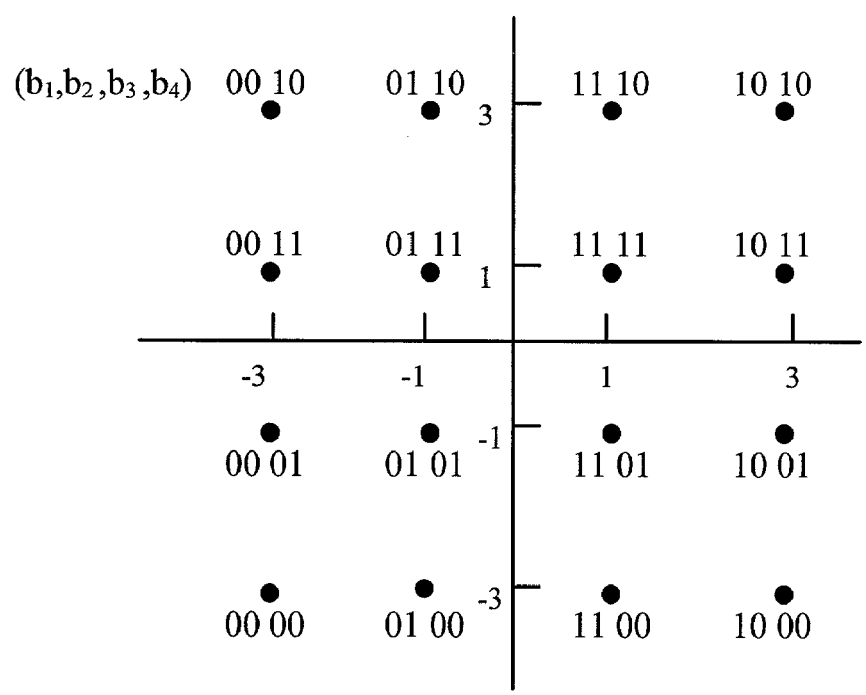
FIG. 5 is a block diagram illustrating a constellation of 16-QAM symbols.
Figure 6:
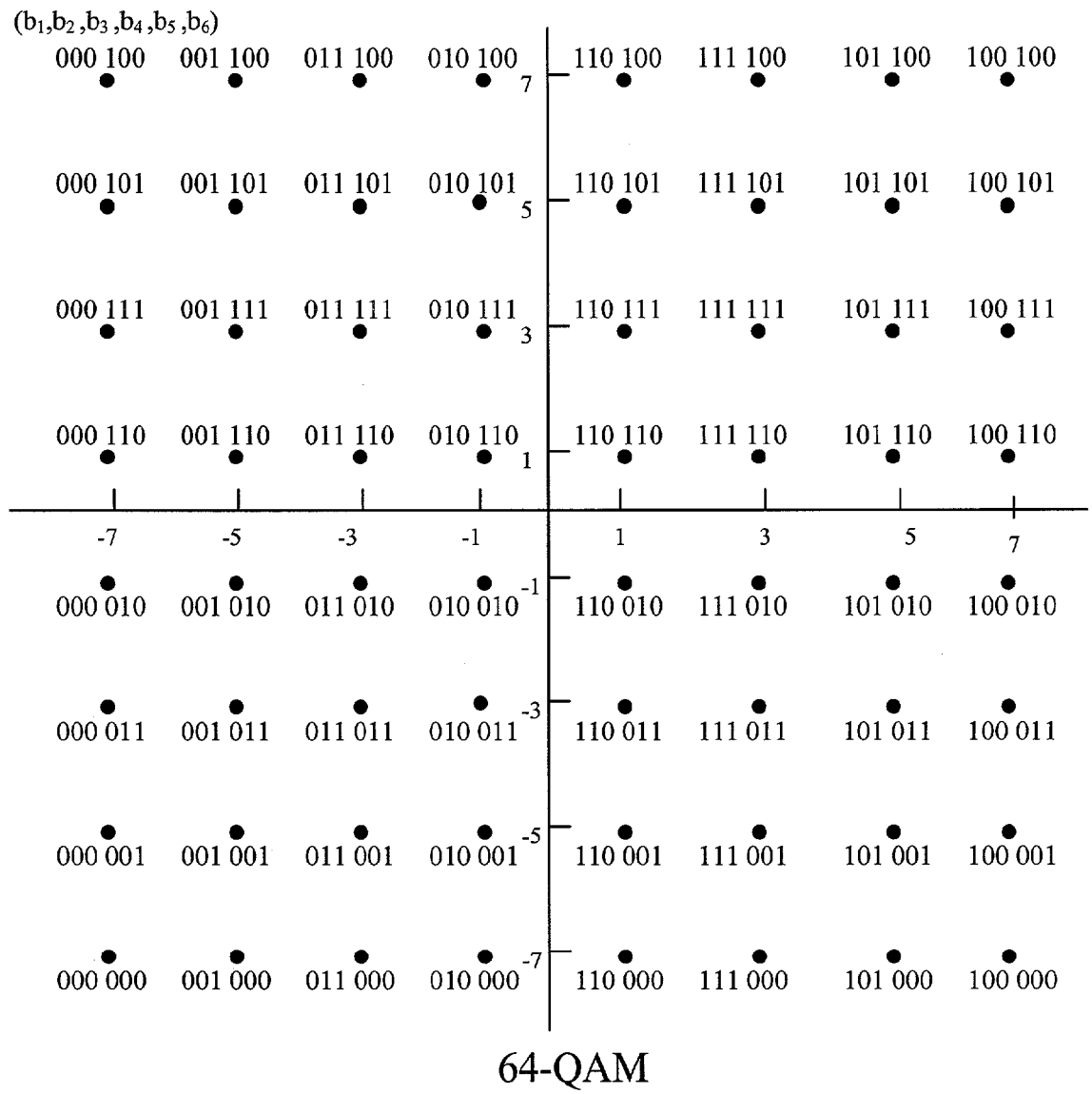
FIG. 6 is a block diagram illustrating a constellation of 64-QAM symbols.

FIGS. 3–6 are graphs illustrating typical gray-coded QAM constellations that may be used for QAM symbol coding in accordance with various embodiments of the invention. FIG. 3, for example, illustrates a BPSK symbol constellation. FIG. 4 represents a symbol constellation for 4-QAM coding, FIG. 5 represents a symbol constellation for 16-QAM coding, and FIG. 6 represents a symbol constellation for 64-QAM coding. For higher order QAM coding, such as 256-QAM and 1024-QAM, signal constellations are tabulated in Tables 1 and 2, respectively, below.

TABLE 1

| 256-QAM Mapping | | | |
| --- | --- | --- | --- |
| Coded bits ($b_1, b_2, b_3, b_4$) | Real part | Coded bits ($b_5, b_6, b_7, b_8$) | Imaginary part |
| 0000 | −15 | 0000 | −15 |
| 0001 | −13 | 0001 | −13 |
| 0011 | −11 | 0011 | −11 |

TABLE 1-continued

256-QAM Mapping

| Coded bits ($b_1, b_2, b_3, b_4$) | Real part | Coded bits ($b_5, b_6, b_7, b_8$) | Imaginary part |
|---|---|---|---|
| 0010 | −9 | 0010 | −9 |
| 0110 | −7 | 0110 | −7 |
| 0111 | −5 | 0111 | −5 |
| 0101 | −3 | 0101 | −3 |
| 0100 | −1 | 0100 | −1 |
| 1100 | 1 | 1100 | 1 |
| 1101 | 3 | 1101 | 3 |
| 1111 | 5 | 1111 | 5 |
| 1110 | 7 | 1110 | 7 |
| 1010 | 9 | 1010 | 9 |
| 1011 | 11 | 1011 | 11 |
| 1001 | 13 | 1001 | 13 |
| 1000 | 15 | 1000 | 15 |

TABLE 2

1024-QAM Mapping

| Coded bits ($b_1, b_2, b_3, b_4, b_5$) | Real part | Coded bits ($b_6, b_7, b_8, b_9, b_{10}$) | Imaginary part |
|---|---|---|---|
| 00000 | −31 | 00000 | −31 |
| 00001 | −29 | 00001 | −29 |
| 00011 | −27 | 00011 | −27 |
| 00010 | −25 | 00010 | −25 |
| 00110 | −23 | 00110 | −23 |
| 00111 | −21 | 00111 | −21 |
| 00101 | −19 | 00101 | −19 |
| 00100 | −17 | 00100 | −17 |
| 01100 | −15 | 01100 | −15 |
| 01101 | −13 | 01101 | −13 |
| 01111 | −11 | 01111 | −11 |
| 01110 | −9 | 01110 | −9 |
| 01010 | −7 | 01010 | −7 |
| 01011 | −5 | 01011 | −5 |
| 01001 | −3 | 01001 | −3 |
| 01000 | −1 | 01000 | −1 |
| 11000 | 1 | 11000 | 1 |
| 11001 | 3 | 11001 | 3 |
| 11011 | 5 | 11011 | 5 |
| 11010 | 7 | 11010 | 7 |
| 11110 | 9 | 11110 | 9 |
| 11110 | 9 | 11110 | 9 |
| 11111 | 11 | 11111 | 11 |
| 11101 | 13 | 11101 | 13 |
| 11100 | 15 | 11100 | 15 |
| 10100 | 17 | 10100 | 17 |
| 10101 | 19 | 10101 | 19 |
| 10111 | 21 | 10111 | 21 |
| 10110 | 23 | 10110 | 23 |
| 10010 | 25 | 10010 | 25 |
| 10011 | 27 | 10011 | 27 |
| 10001 | 29 | 10001 | 29 |
| 10000 | 31 | 10000 | 31 |

Coded bits are mapped to the real and imaginary components of a QAM symbol independently. For example, for 64-QAM, the first three bits ($b_1, b_2, b_3$) determine the real part of the QAM symbol and the remaining three bits ($b_4, b_5, b_6$) determine the imaginary part of the QAM symbol. With this type of Gray-coded QAM, the boundary lines that separate the QAM symbols associated with $b_l=1$ from those associated with $b_l=0$, i.e., the inter-bit decision boundaries, are either horizontal or vertical, for any l. It can be further shown that when these decision boundaries are horizontal, the "nearest" symbols $a_{min1}$ and $a_{min0}$, for purposes of expressions (3) and (4) above, share a common real (horizontal) component, and differ only in their imaginary components. Likewise, when the boundaries are vertical, $a_{min1}$ and $a_{min0}$ share the same imaginary (vertical) component.

Advantageously, the soft demapping technique may be based on a subset of the transmitted symbol constellation for reduced complexity. It can be seen that in expression (8) above, advantageously, the soft decision $\Lambda(b_l)$ is given as a piece-wise linear function of either $$\sum_{i=1}^{L} \text{Re}\{u_i H_i^*\} \text{ or } \sum_{i=1}^{L} \text{Im}\{u_i H_i^*\}.$$

Thus, the soft-demapping technique may apply piecewise linear functions based on the real and imaginary components of the combined observation and on the combined energy of the channel responses. For a given bit $b_l$, the absolute value of the slope of the function $\Lambda(b_l)$ can change as a function of $$\sum_{i=1}^{L} \text{Re}\{u_i H_i^*\} \text{ or } \sum_{i=1}^{L} \text{Im}\{u_i H_i^*\}.$$

A further complexity-reducing approximation can be made to expression (8) by confining $a_{min1}$ and $a_{min0}$ to be near the boundary lines. When the "nearest" symbols $a_{min1}$ and $a_{min0}$ are chosen only from the symbols closest to the nearest boundary line, the absolute value of the slope in $\Lambda(b_l)$ remains fixed for a given bit $b_l$, further reducing implementation complexity. Thus, the soft demapping rules may be based on minimum distance symbols $a_{min1}$ and $a_{min0}$ associated with pertinent bit values in the transmitted symbol.

For an illustrative example, consider 16-QAM coding and two receive antennas, as shown in the example of FIG. 2. In the constellations shown in FIG. 5, the boundary line that separates the symbols associated with $b_1=1$ from the symbols associated with $b_1=0$ is the vertical line through the origin. Since the boundary is vertical, the imaginary (vertical) components of $a_{min1}$ and $a_{min0}$ are identical and thus do not play a role. Consequently, focusing on the symbols near the boundary, it is possible to simply set $a_{min1}=1$ and an $a_{min0}=-1$. Substituting these values in expression (8), letting $$d_I = \sum_{i=1}^{2} \text{Re}\{u_i^* H_i^*\} \qquad (10)$$

and ignoring the approximation, expression (8) can be rewritten as:

$$\Lambda(b_1)=d_I. \qquad (11)$$

Figure 7:
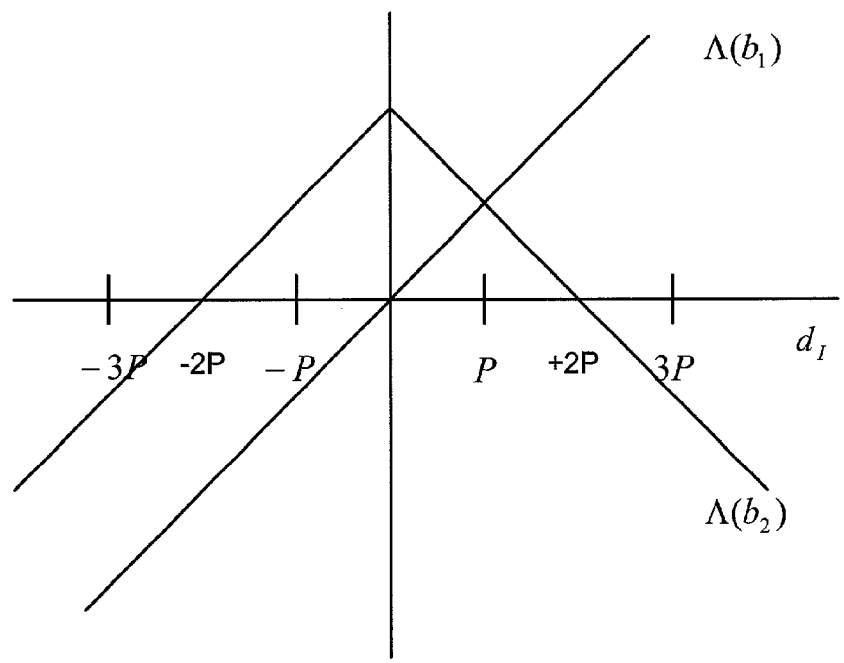
FIG. 7 is a graph illustrating piecewise soft decisions $\Lambda(b_1)$ and $\Lambda(b_2)$ summed over diversity paths for 16-QAM encoding.

This soft decision rule is illustrated for $b_1$ in FIG. 7 for the 16-QAM case. For the second bit $b_2$, the boundaries are formed at +2 and −2, as also shown in FIG. 7. For the region close to the +2 boundary, i.e., when $d_I>0$, we can set $a_{min1}=+1$ and $a_{min0}=+3$, again ignoring the imaginary components. For the region close to the −2 boundary, i.e., when $d_I<0$, we can set $a_{min1}=-1$ and $a_{min0}=-3$. Expression (8) then reduces to:

$$\Lambda(b_2) = \begin{cases} -d_I + 2P & \text{for } d_I > 0 \\ d_I + 2P & \text{for } d_I < 0 \end{cases} \quad (12)$$

$$P = \sum_{i=1}^{2} |H_i|^2. \quad (13)$$

The boundary line for $b_3$ is formed as the horizontal line through the origin. The nearest symbols around the boundary are $a_{min1}=+j$ and $a_{min0}=-j$, ignoring the common real component. Substituting these values in expression (8) and letting:

$$d_Q = \sum_{i=1}^{2} \text{Im}\{u_i^* H_i^*\}, \quad (14)$$

the following is obtained:

$$\Lambda(b_3)=d_Q. \quad (15)$$

Following similar steps, it is possible to obtain:

$$\Lambda(b_4) = \begin{cases} -d_Q + 2P & \text{for } d_Q > 0 \\ d_Q + 2P & \text{for } d_Q < 0. \end{cases} \quad (16)$$

Figure 8:
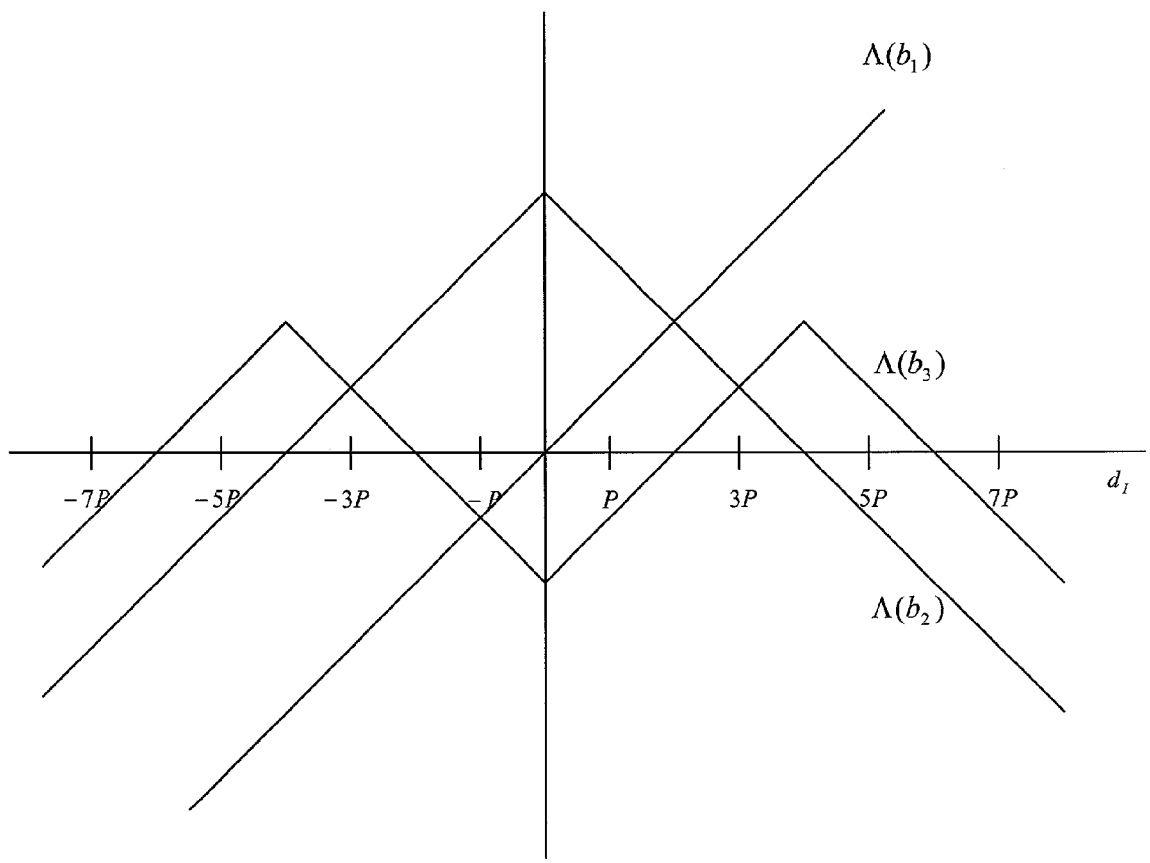
FIG. 8 is a graph illustrating piecewise soft decisions $\Lambda(b_1)$, $\Lambda(b_2)$ and $\Lambda(b_3)$ summed over diversity paths for 64-QAM encoding.

A similar soft decision rule can be applied for a single antenna case with an equalized signal. For reduced complexity, the minimum distance symbols can be further confined to be within a predetermined distance of an inter-symbol decision boundary. If the nearest symbols are not confined close to the boundary, a somewhat more complicated but slightly improved soft decision rule for the first bit can be obtained as follows:

$$\Lambda(b_1) = \begin{cases} d_I & \text{for } |d_I| < 2P \\ 2d_I - 2P & \text{for } d_I \geq 2P \\ -2d_I + 2P & \text{for } d_I < 2P \end{cases} \quad (17)$$

where $a_{min1}=+3$ and $a_{min0}=-1$ for the second region, and $a_{min1}=-3$ and $a_{min0}=+1$ for the third region. Similarly, for the third bit $b_3$, a soft decision rue can be obtained as follows:

$$\Lambda(b_3) = \begin{cases} d_Q & \text{for } |d_Q| < 2P \\ 2d_Q - 2P & \text{for } d_Q \geq 2P \\ -2d_Q + 2P & \text{for } d_Q < 2P \end{cases} \quad (18)$$

where the nearest symbols are set as $a_{min1}=+3j$ and $a_{min0}=-j$ for the second region and $a_{min1}=-3j$ and $a_{min0}=j$ for the third region. Following the same steps, the soft decisions for 64-QAM can be obtained as shown in FIG. 8. In the above examples, it is noted that the soft decision for a subsequently computed bit, bit n, may computed recursively from the previously computed soft decision, bit n−1.

Figure 9:
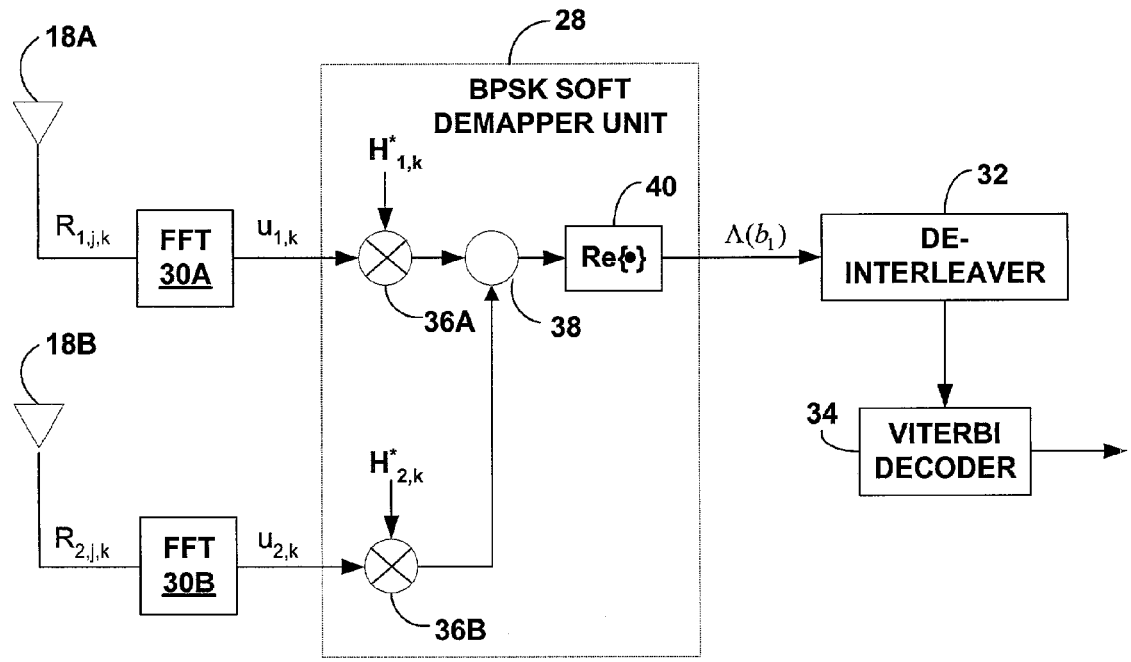
FIG. 9 is a block diagram illustrating an exemplary soft demapping unit for BPSK decoding.

FIG. 9 is a block diagram illustrating a soft demapping unit 28 for BPSK encoding, the lowest order form of QAM encoding. Soft demapping unit 28 may be configured to apply soft decision rules as described above. Although the example of FIG. 9 pertains to a wireless communication device 16 having two receive antennas 18A, 18B for receive diversity, the invention can be readily extended to an arbitrary number of multiple antennas. As shown in FIG. 9, first and second FFT units 30A, 30B receive first and second RF signals $R_{1,j,k}$ and $R_{2,j,k}$ from antennas 18A, 18B, respectively. FFT units 30A, 30B demodulate the incoming RF signals $R_{1,j,k}$ and $R_{2,j,k}$ to produce FFT outputs that provide demodulated signals $u_{1,k}$ and $u_{2,k}$, respectively.

For BPSK in the example of FIG. 9, the soft decision is simply:

$$\Lambda(b_1)=d_I. \quad (19)$$

Within soft demapper unit 28, multipliers 36A, 36B equalize demodulated signals $u_{1,k}$ and $u_{2,k}$ with channel gain coefficients $H^*_{1,k}$ and $H^*_{2,k}$, respectively. A signal combiner 38 combines the equalized signals produced by multipliers 36A, 36B. Element 40 extracts the real component of the combined signal and applies rules as described above to produce a soft decision $\Lambda(b_1)$. The soft decision $\Lambda(b_1)$ is applied to a de-interleaver 32, which produces a de-interleaved soft decision that can be used to compute branch metrics for use in a Viterbi convolutional decoder 34. Notably, there is no need for separate hardware for equalization and weighting by channel signal-to-noise ratio (SNR). Instead, equalization is integrated with the hardware used to perform the soft-demapping function. Accordingly, the OFDM demodulator (FFTs 34A, 34B), de-interleaver 30, and Viterbi decoder 32 are shown together in FIG. 9. For other mapping methods illustrated with respect to FIGS. 10–14 below, however, only the applicable soft demapper unit will be shown for brevity. In the examples of FIGS. 10–14, the FFT units 34A, 34B, de-interleaver 30, and Viterbi decoder 32 may be provided substantially as shown in FIG. 9.

Figure 10:
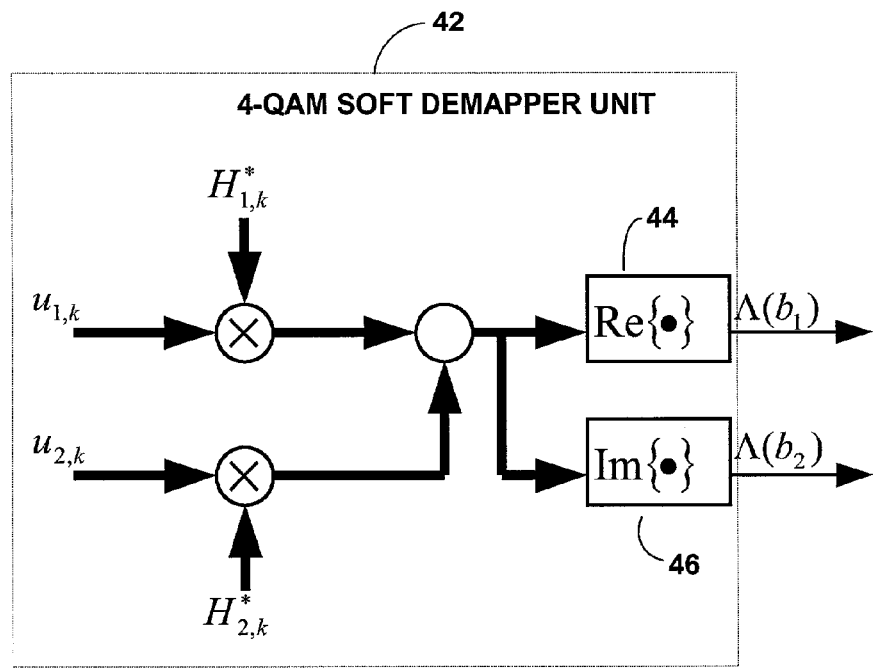
FIG. 10 is a block diagram illustrating an exemplary soft demapping unit for 4-QAM decoding.

FIG. 10 is a block diagram illustrating an exemplary soft demapping unit 42 for 4-QAM encoding. In 4-QAM mapping, the coded bits $b_1$ and $b_2$ are mapped to the real and imaginary parts, respectively, of a symbol, as follows:

$$\Lambda(b_1)=d_I \quad (20)$$

$$\Lambda(b_2)=d_Q. \quad (21)$$

Figure 11:
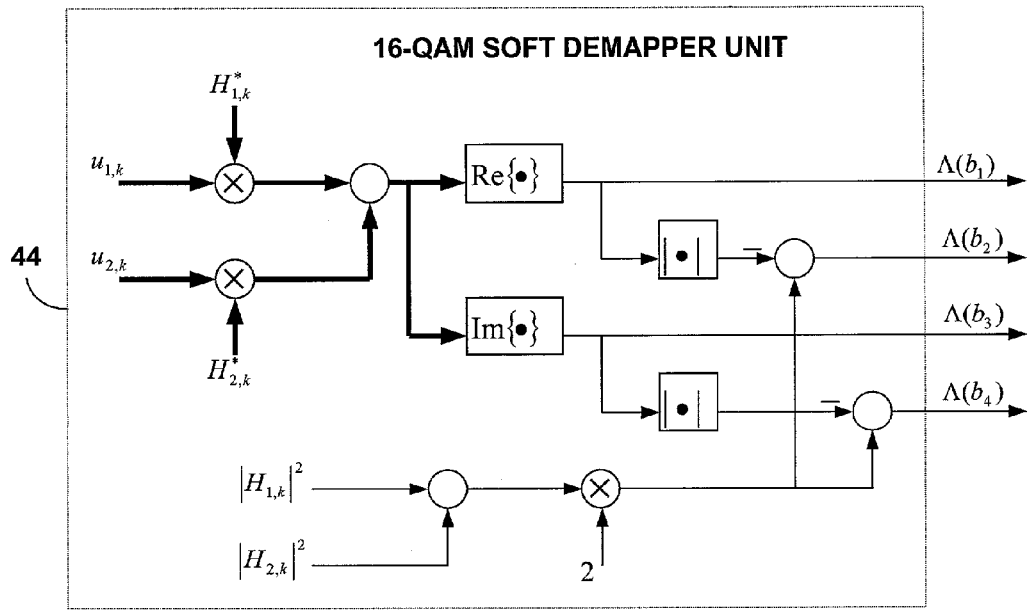
FIG. 11 is a block diagram illustrating a soft demapping unit for 16-QAM decoding.

FIG. 11 is a block diagram illustrating a soft demapping unit 44 for 16-QAM encoding. In 16-QAM mapping, the coded bit sequence $(b_1,b_2)$ is mapped to the real part of a symbol and $(b_3,b_4)$ to the imaginary part. The soft demapping technique may involve generating one or more soft decision bits indicative of the transmitted symbol for a combined observation according to soft demapping rules that are based on a subset of the transmitted symbol constellation for reduced complexity, e.g., as described above with respect to expression (8). As will be described, the soft demapping rules may be based on the minimum distance symbols associated with pertinent bits in the transmitted symbol. A minimum distance symbol may refer to a symbol that is closest to a particular decision boundary. In addition, the minimum distance symbols can be further constrained to be near the pertinent decision boundary, i.e., within a predetermined distance of the decision boundary. As an illustration, for reduced complexity, the soft decisions can be determined according to piecewise decision rules as follows:

$$\Lambda(b_1) = d_I \quad (22)$$

$$\Lambda(b_2) = \begin{cases} -d_I + 2P & \text{for } d_I > 0 \\ d_I + 2P & \text{for } d_I < 0 \end{cases} \quad (23)$$
$$= -|\Lambda(b_1)| + 2P$$

$$\Lambda(b_3) = d_Q \quad (24)$$

$$\Lambda(b_4) = \begin{cases} -d_Q + 2P & \text{for } d_Q > 0 \\ d_Q + 2P & \text{for } d_Q < 0 \end{cases} \quad (25)$$
$$= -|\Lambda(b_3)| + 2P$$

Figure 12:
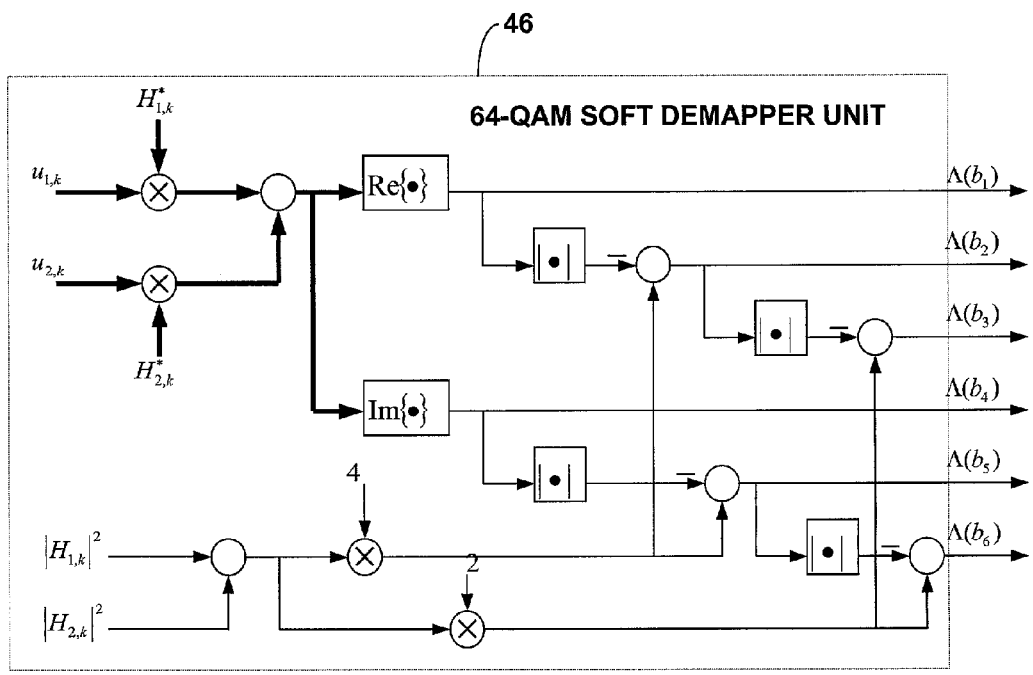
FIG. 12 is a block diagram illustrating a soft demapping unit for 64-QAM decoding.

FIG. 12 is a block diagram illustrating a soft demapping unit 46 for 64-QAM encoding. For 64-QAM, the coded bit sequence ($b_1,b_2,b_3$) is mapped to the real part of a symbol, and the coded bit sequence ($b_4,b_5,b_6$) is mapped to the imaginary part. The soft decisions can be represented by piecewise functions as follows:

$$\Lambda(b_1) = d_I \quad (26)$$

$$\Lambda(b_2) = \begin{cases} -d_I + 4P & \text{for } d_I > 0 \\ d_I + 4P & \text{for } d_I < 0 \end{cases} \quad (27)$$
$$= -|\Lambda(b_1)| + 4P$$

$$\Lambda(b_3) = \begin{cases} d_I + 6P & \text{for } d_I \leq -4P \\ -d_I - 2P & \text{for } -4P < d_I \leq 0 \\ d_I - 2P & \text{for } 0 < d_I \leq 4P \\ -d_I + 6P & \text{for } d_I > 4P \end{cases} \quad (28)$$
$$= -|\Lambda(b_2)| + 2P$$

$$\Lambda(b_4) = d_Q \quad (29)$$

$$\Lambda(b_5) = \begin{cases} -d_Q + 4P & \text{for } d_Q > 0 \\ d_Q + 4P & \text{for } d_Q < 0 \end{cases} \quad (30)$$
$$= -|\Lambda(b_4)| + 4P$$

$$\Lambda(b_6) = \begin{cases} d_Q + 6P & \text{for } d_Q \leq -4P \\ -d_Q - 2P & \text{for } -4P < d_Q \leq 0 \\ d_Q - 2P & \text{for } 0 < d_Q \leq 4P \\ -d_Q + 6P & \text{for } d_Q > 4P \end{cases} \quad (31)$$
$$= -|\Lambda(b_5)| + 2P$$

Figure 13:
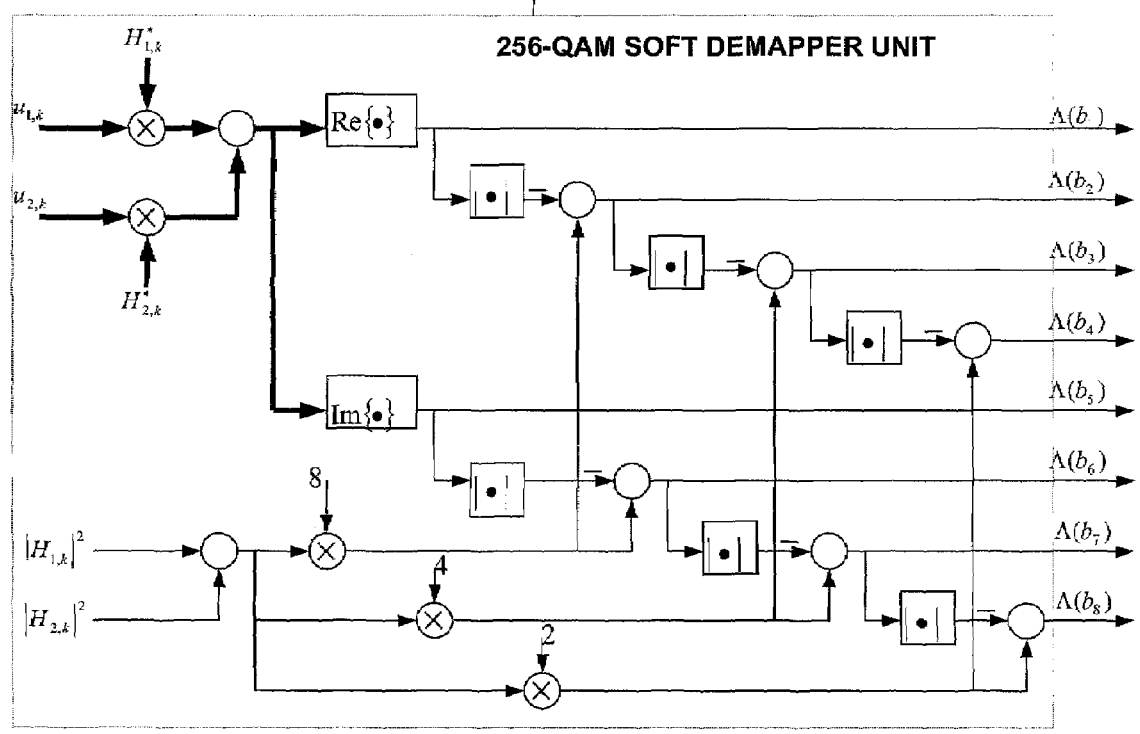
FIG. 13 is a block diagram illustrating a soft demapping unit for 256-QAM decoding.

FIG. 13 is a block diagram illustrating a soft demapping unit 48 for 256-QAM encoding. In 256-QAM coding, the procedure described above with reference to FIG. 12 can be followed. The soft decisions for 256-QAM coding are represented as follows:

$$\Lambda(b_1) = d_I \quad (32)$$

$$\Lambda(b_2) = -|\Lambda(b_1)| + 8P \quad (33)$$

$$\Lambda(b_3) = -|\Lambda(b_2)| + 4P \quad (34)$$

$$\Lambda(b_4) = -|\Lambda(b_3)| + 2P \quad (35)$$

$$\Lambda(b_5) = d_Q \quad (36)$$

$$\Lambda(b_6) = -|\Lambda(b_5)| + 8P \quad (37)$$

$$\Lambda(b_7) = -|\Lambda(b_6)| + 4P \quad (38)$$

$$\Lambda(b_8) = -|\Lambda(b_7)| + 2P \quad (39)$$

Figure 14:
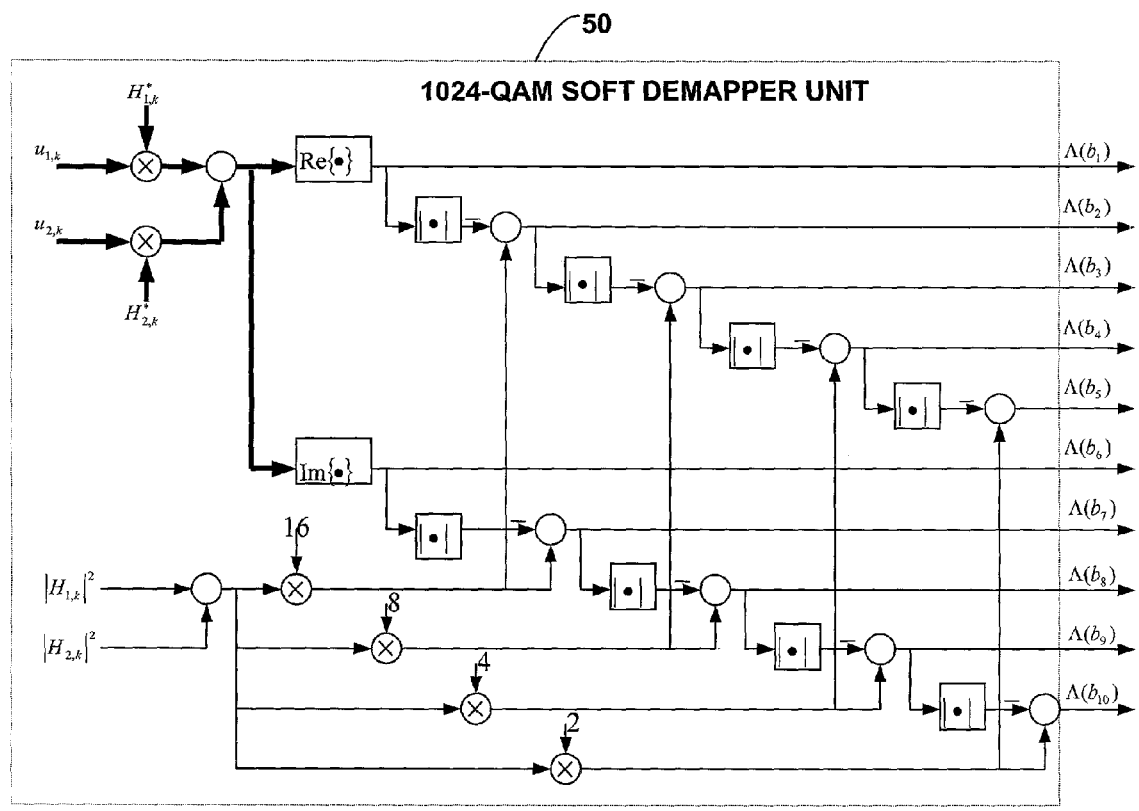
FIG. 14 is a block diagram illustrating a soft demapping unit for 1024-QAM decoding.

FIG. 14 is a block diagram illustrating a soft demapping unit 50 for 1024-QAM encoding. In 1024-QAM coding, the soft decisions for 1024-QAM are represented as follows:

$$\Lambda(b_1) = d_I \quad (40)$$

$$\Lambda(b_2) = -|\Lambda(b_1)| + 16P \quad (41)$$

$$\Lambda(b_3) = -|\Lambda(b_2)| + 8P \quad (42)$$

$$\Lambda(b_4) = -|\Lambda(b_3)| + 4P \quad (43)$$

$$\Lambda(b_5) = -|\Lambda(b_4)| + 2P \quad (44)$$

$$\Lambda(b_6) = d_Q \quad (45)$$

$$\Lambda(b_7) = -|\Lambda(b_6)| + 16P \quad (46)$$

$$\Lambda(b_8) = -|\Lambda(b_7)| + 8P \quad (47)$$

$$\Lambda(b_9) = -|\Lambda(b_8)| + 4P \quad (48)$$

$$\Lambda(b_{10}) = -|\Lambda(b_9)| + 2P \quad (49)$$

A phase error estimator for a wireless communication device incorporating a receive diversity arrangement as described herein will now be discussed. An OFDM receiver typically uses a single clock source to derive all necessary clocks for carrier recovery and sampling of a received signal. Similarly, clocks for an OFDM transmitter are typically derived from a single clock source. In this case, the phase errors existing both in the carrier and the sampler will not change over the diversity paths. Including the carrier and sampling phase errors, the demodulated signal (observation sample) $u_{i,n}$ at the output of the FFT unit in an OFDM system can be represented by:

$$u_{i,n} = S_n \cdot H_{i,n} \cdot e^{j(n\Delta\phi_s + \Delta\phi_c)} + N'_{i,n}, \quad (50)$$

where $S_n$, $-N/2 \leq n \leq N/2$, is the transmitted symbol through the nth sub-carrier, $H_{i,n}$, $1 \leq i \leq L$, is the channel response of the nth sub-carrier and the ith diversity path, $j=\sqrt{-1}$, $\Delta\phi_c$ is the carrier phase error, $\Delta\phi_s$ is the sampler phase error, and $$N'_{i,n}$$

is the phase rotated noise sample. Note that in expression (50), only one symbol is considered. The phase errors $\Delta\phi_c$ and $\Delta\phi_s$ remain the same in different receive diversity paths.

Multiplying both sides of expression (50) by $$S_n^* \cdot H_{i,n}^*$$

and summing the results over the diversity paths results in $$\sum_{i=1}^{L} u_{i,n} \cdot S_n^* \cdot H_{i,n}^* = e^{j(n\Delta\phi_s + \Delta\phi_c)} \sum_{i=1}^{L} |S_n \cdot H_{i,n}|^2 + \sum_{i=1}^{L} N''_{i,n}, \quad (51)$$

where $$N''_{i,n} = N'_{i,n} \cdot S_n^* \cdot H_{i,n}^*.$$

In accordance with the invention, the phase error estimator can share hardware used for the soft demapper unit of the Viterbi algorithm. From expression (51), the phase error can be estimated as:

$$n\Delta\phi_s + \Delta\phi_c = \text{angle}\left(\sum_{i=1}^{L} u_{i,n} \cdot H_{i,n}^* \cdot S_n^*\right). \quad (52)$$

The estimates of the channel response and transmitted symbol based on the received signal can be used for $H_{i,n}$ and $S_n$, respectively, if these are not known to the receiver. The phase error is typically so small that the angle in (52) can be approximated by the division of the imaginary part of the argument by the real part as:

$$n\Delta\phi_s + \Delta\phi_c = \frac{\text{Im}\left(\sum_{i=1}^{L} u_{i,n} \cdot H_{i,n}^* \cdot S_n^*\right)}{\text{Re}\left(\sum_{i=1}^{L} u_{i,n} \cdot H_{i,n}^* \cdot S_n^*\right)}. \quad (53)$$

Each component of the phase errors can be estimated by averaging expression (53) throughout the sub-carriers as represented below:

$$\Delta\phi_c = \quad (54)$$

$$\frac{1}{(N/2)} \sum_{n=1}^{N/2} \left(\frac{\text{Im}\left(\sum_{i=1}^{L} u_{i,n} \cdot H_{i,n}^* \cdot S_n^*\right)}{\text{Re}\left(\sum_{i=1}^{L} u_{i,n} \cdot H_{i,n}^* \cdot S_n^*\right)} + \frac{\text{Im}\left(\sum_{i=1}^{L} u_{i,-n} \cdot H_{i,-n}^* \cdot S_{-n}^*\right)}{\text{Re}\left(\sum_{i=1}^{L} u_{i,-n} \cdot H_{i,-n}^* \cdot S_{-n}^*\right)}\right) \text{ and }$$

$$\Delta\phi_s = \frac{1}{(N/2+1)(N/2)} \sum_{n=1}^{N/2} \left(\frac{\text{Im}\left(\sum_{i=1}^{L} u_{i,n} \cdot H_{i,n}^* \cdot S_n^*\right)}{\text{Re}\left(\sum_{i=1}^{L} u_{i,n} \cdot H_{i,n}^* \cdot S_n^*\right)} - \frac{\text{Im}\left(\sum_{i=1}^{L} u_{i,n-N/2-1} \cdot H_{i,n-N/2-1}^* \cdot S_{n-N/2-1}^*\right)}{\text{Re}\left(\sum_{i=1}^{L} u_{i,n-N/2-1} \cdot H_{i,n-N/2-1}^* \cdot S_{n-N/2-1}^*\right)}\right). \quad (55)$$

The above averaging (summation) of the phase errors associated with an individual sub-carrier can be made selective in order to save hardware or reduce the latency involved in the phase error calculation. In particular, if there are known transmitted symbols such as pilot tones, the phase errors of these tones can be used in the calculation of the phase errors.

The phase error estimation in expression (55) does not need to consider the channel SNR associated with the sub-carrier and diversity path. Assuming the channel noise is additive white Gaussian, the SNR of the sub-carrier n of the ith diversity path is proportional to $|H_{i,n}|^2$. The combined SNR over the diversity paths is also proportional to $$\sum_{i=1}^{L} |H_{i,n}|^2.$$

The performance of the phase error estimator represented in expressions (54) and (55) can be improved by weighting individual phase error estimates by the combined SNR as represented below:

$$\Delta\phi_c = \frac{1}{(N/2) \cdot sumw} \sum_{n=1}^{N/2} \left(\frac{\text{Im}\left(\sum_{i=1}^{L} u_{i,n} \cdot H_{i,n}^* \cdot S_n^*\right)}{\text{Re}\left(\sum_{i=1}^{L} u_{i,n} \cdot H_{i,n}^* \cdot S_n^*\right)} \cdot \sum_{i=1}^{L} |H_{i,n}|^2 + \frac{\text{Im}\left(\sum_{i=1}^{L} u_{i,-n} \cdot H_{i,-n}^* \cdot S_{-n}^*\right)}{\text{Re}\left(\sum_{i=1}^{L} u_{i,-n} \cdot H_{i,-n}^* \cdot S_{-n}^*\right)} \cdot \sum_{i=1}^{L} |H_{i,-n}|^2\right) \quad (56)$$

$$\Delta\phi_s = \quad (57)$$

$$\frac{1}{(N/2+1)(N/2) \cdot sumw} \sum_{n=1}^{N/2} \left(\frac{\text{Im}\left(\sum_{i=1}^{L} u_{i,n} \cdot H_{i,n}^* \cdot S_n^*\right)}{\text{Re}\left(\sum_{i=1}^{L} u_{i,n} \cdot H_{i,n}^* \cdot S_n^*\right)} \cdot \sum_{i=1}^{L} |H_{i,n}|^2 - \frac{\text{Im}\left(\sum_{i=1}^{L} u_{i,n-N/2-1} \cdot H_{i,n-N/2-1}^* \cdot S_{n-N/2-1}^*\right)}{\text{Re}\left(\sum_{i=1}^{L} u_{i,n-N/2-1} \cdot H_{i,n-N/2-1}^* \cdot S_{n-N/2-1}^*\right)} \cdot \sum_{i=1}^{L} |H_{i,n-N/2-1}|^2\right)$$

where $$sumw = \sum_{n=-N/2, n \neq 0}^{N/2} \sum_{i=1}^{L} |H_{i,n}|^2.$$

Because pairs of sub-carrier phase errors are used to estimate the individual carrier and sampler phase error components, the weighting can be applied piece-wise as follows:

$$\Delta\phi_c = \frac{1}{(N/2) \cdot sumw_c} \tag{58}$$

$$\sum_{n=1}^{N/2} \left( \frac{\text{Im}\left(\sum_{i=1}^{L} u_{i,n} \cdot H_{i,n}^* \cdot S_n^*\right)}{\text{Re}\left(\sum_{i=1}^{L} u_{i,n} \cdot H_{i,n}^* \cdot S_n^*\right)} + \frac{\text{Im}\left(\sum_{i=1}^{L} u_{i,-n} \cdot H_{i,-n}^* \cdot S_{-n}^*\right)}{\text{Re}\left(\sum_{i=1}^{L} u_{i,-n} \cdot H_{i,-n}^* \cdot S_{-n}^*\right)} \right) \cdot$$

$$\min\left(\sum_{i=1}^{L} |H_{i,n}|^2, \sum_{i=1}^{L} |H_{i,-n}|^2\right)$$

$$\Delta\phi_s = \frac{1}{(N/2+1)(N/2) \cdot sumw_s} \sum_{n=1}^{N/2} \left( \frac{\text{Im}\left(\sum_{i=1}^{L} u_{i,n} \cdot H_{i,n}^* \cdot S_n^*\right)}{\text{Re}\left(\sum_{i=1}^{L} u_{i,n} \cdot H_{i,n}^* \cdot S_n^*\right)} - \right. \tag{59}$$

$$\left. \frac{\text{Im}\left(\sum_{i=1}^{L} u_{i,n-N/2-1} \cdot H_{i,n-N/2-1}^* \cdot S_{n-N/2-1}^*\right)}{\text{Re}\left(\sum_{i=1}^{L} u_{i,n-N/2-1} \cdot H_{i,n-N/2-1}^* \cdot S_{n-N/2-1}^*\right)} \right) \cdot$$

$$\min\left(\sum_{i=1}^{L} |H_{i,n}|^2, \sum_{i=1}^{L} |H_{i,n-N/2-1}|^2\right)$$

where $sumw_c = \sum_{n=1}^{N/2} \min\left(\sum_{i=1}^{L} |H_{i,n}|^2, \sum_{i=1}^{L} |H_{i,-n}|^2\right)$ and $$sumw_s = \sum_{n=1}^{N/2} \min\left(\sum_{i=1}^{L} |H_{i,n}|^2, \sum_{i=1}^{L} |H_{i,n-N/2-1}|^2\right).$$

The phase error is small under normal operating conditions. In this case, the imaginary part of $$\sum_{i=1}^{L} u_{i,n} \cdot H_{i,n}^* \cdot S_n^*$$

is much smaller than the real part. The phase error estimate proportional to the actual phase error can be obtained by the expression:

$$\Delta\phi_c = \frac{1}{(N/2) \cdot sumw_c} \tag{60}$$

$$\sum_{n=1}^{N/2} \left( \text{Im}\left(\sum_{i=1}^{L} u_{i,n} \cdot H_{i,n}^* \cdot S_n^*\right) + \text{Im}\left(\sum_{i=1}^{L} u_{i,-n} \cdot H_{i,-n}^* \cdot S_{-n}^*\right) \right) \cdot$$

$$\min\left(\sum_{i=1}^{L} |H_{i,n}|^2, \sum_{i=1}^{L} |H_{i,-n}|^2\right)$$

-continued $$\Delta\phi_s = \frac{1}{(N/2+1)(N/2) \cdot sumw_s} \sum_{n=1}^{N/2} \left( \text{Im}\left(\sum_{i=1}^{L} u_{i,n} \cdot H_{i,n}^* \cdot S_n^*\right) - \right. \tag{61}$$

$$\left. \text{Im}\left(\sum_{i=1}^{L} u_{i,n-N/2-1} \cdot H_{i,n-N/2-1}^* \cdot S_{n-N/2-1}^*\right) \right) \cdot$$

$$\min\left(\sum_{i=1}^{L} |H_{i,n}|^2, \sum_{i=1}^{L} |H_{i,n-N/2-1}|^2\right)$$

In effect, the carrier phase error $\Delta\phi_c$ can be estimated by removing the sampling phase error component and averaging the residual subcarrier phase errors. The phase shift magnitude of the subcarrier 'n' due to the sampling phase error is the same amount as for the complementary subcarrier '−n,' i.e., the complementary subcarrier. However, the signs of the phase shift for the complementary pair of subcarriers 'n' and '−n' are opposite. By adding the two subcarrier phase errors corresponding to the complementary subcarriers 'n' and '−n', the phase shift due to the sampling phase error can be removed.

Also, the sampling phase error $\Delta\phi_s$ can be estimated by removing the carrier phase error component and averaging the residual subcarrier phase errors. The phase shift due to the carrier phase error is the same throughout the subcarriers. By taking the difference of any two subcarrier phase errors, the phase shift due to the carrier phase error can be removed. To obtain the largest residual phase error after taking the difference, the two subcarriers taken for the difference should be separated by the greatest extent. For the subcarriers indexed in the range of [−N/2, N/2], the complementary pairs of subcarriers can be formed as (−N/2, 1), (−N/2+1,2), . . . , (−1, N/2), where each pair has the index difference of N/2+1.

In the above phase error estimation expressions (56), (57), (58), (59), (60), and (61), the weighting factors can be quantized to reduce hardware complexity. For example, the weighting factors $$\sum_{i=1}^{L} |H_{i,n}|^2$$

for varying n can be quantized to values nearest to the power of 2 value. The estimation expressions (54) and (55) can also be modified to:

$$\Delta\phi_c = \frac{1}{(N/2)} \sum_{n=1}^{N/2} \left( \text{Im}\left(\sum_{i=1}^{L} u_{i,n} \cdot H_{i,n}^* \cdot S_n^*\right) + \text{Im}\left(\sum_{i=1}^{L} u_{i,-n} \cdot H_{i,-n}^* \cdot S_{-n}^*\right) \right) \tag{62}$$

$$\Delta\phi_s = \frac{1}{(N/2+1)(N/2)} \sum_{n=1}^{N/2} \left( \text{Im}\left(\sum_{i=1}^{L} u_{i,n} \cdot H_{i,n}^* \cdot S_n^*\right) - \right. \tag{63}$$

$$\left. \text{Im}\left(\sum_{i=1}^{L} u_{i,n-N/2-1} \cdot H_{i,n-N/2-1}^* \cdot S_{n-N/2-1}^*\right) \right)$$

The performance of the phase error detector can be improved further by incorporating the power of the transmitted signal $S_n$ in the averaging process. To examine the noise effect on the accuracy of the phase error estimate for varying transmitted signal power, assume that the channel responses and noises are the same for two observed signals, $u_{i,n}$ and $u_{i,m}$, the phase error is zero, and that only the transmitted signals are different. In particular, $H_{i,n}=H_{i,m}$, $N'_{i,n}=N'_{i,m}$, $\Delta\phi_s=\Delta\phi_c=0$, and $S_n \neq S_m$. Then, for $|S_n|>|S_m|$, the following relationship between the calculated phase errors always holds for the two subcarriers:

$$\text{angle}(u_{i,n})-\text{angle}(H_{i,n})-\text{angle}(S_n) \leq \text{angle}(u_{i,m})-\text{angle}(H_{i,m})-\text{angle}(S_m). \quad (64)$$

Assuming that $H_{i,n}=H_{i,m}$, expression (64) reduces to:

$$\text{angle}(u_{i,n})-\text{angle}(S_n) \leq \text{angle}(u_{i,m})-\text{angle}(S_m). \quad (65)$$

Without the loss of the generality, we can assume that $\text{angle}(S_n)=\text{angle}(S_m)$. Then, expression (65) reduces to:

$$\text{angle}(u_{i,n}) \leq \text{angle}(u_{i,m}). \quad (66)$$

Since the magnitude of $S_n \cdot H_{i,n}$ for the first signal is larger than that of $S_m \cdot H_{i,m}$ for the second signal, for the same noise $$N'_{i,n} = N'_{i,m},$$

the above relationship (66) always holds. In conclusion, the smaller the transmitted signal power is, the more susceptible the phase estimate is to the noise.

To improve the phase error estimate under the noisy channel condition, those transmitted signals with small power can be removed from the phase error calculation. This can simply be implemented by setting the estimated transmitted signal $S_n$ to zero if it has a small power. As an example, for the 256 QAM case, if the estimated transmitted signal $S_n$ is one of $\{(i,j)|i\in\{\pm1,\pm3\} \text{ and } j\in\{\pm1,\pm3\}\}$, then the estimate is set to $S_n=0$. Similarly, for the 64 QAM case, the estimated transmitted signal $S_n$ is set to 0 if it is one of $\{(1,1), (1,-1), (-1,1), (-1,-1)\}$. The angle operator should output a zero angle for the zero input for both the real part and the imaginary part. With these settings, both 64 QAM and 256 QAM coding do not use 6.25% of the signal constellation points in the phase error calculation.

According to the IEEE 802.11a standard, four pilot tones are modulated by BPSK. The pilot tones are not affected by the implementation described herein. For IEEE 802.11a applications, even in the extreme situation where none of the transmitted signals are used in the phase error calculation due to small power levels, there are at least four pilot tones used for the phase error calculation. Furthermore, the probability of transmitting all of the signals with small power levels is very low.

Figure 15:
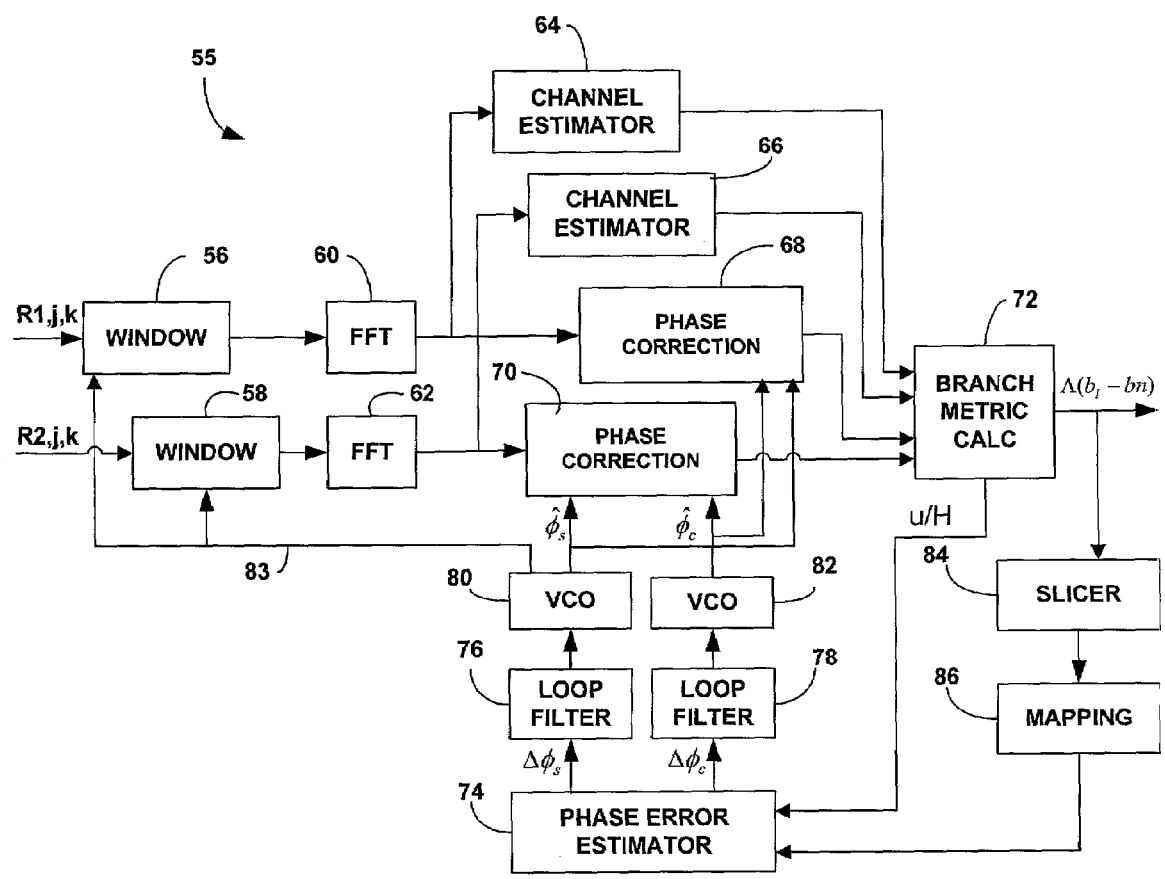
FIG. 15 is a block diagram illustrating a phase locked loop with frequency domain correction.

FIG. 15 is a block diagram illustrating a phase locked loop 55 with frequency domain correction in accordance with an embodiment of the invention. As shown in FIG. 15, phase locked loop 55 includes multiple sampling and demodulation paths corresponding to the multiple signals $R_{1,j,k}$ and $R_{2,j,k}$ received via the receive diversity antennas 18A, 18B. Digital phase locked loop 55 demodulates each signal in portions or blocks. A sampler (not shown in FIG. 15) separates the blocks in each signal $R_{1,j,k}$ and $R_{2,j,k}$ for demodulation. The sampler typically includes an analog-to-digital converter that transforms each of the received analog carrier signals into a digital carrier signal.

The sampler takes a plurality of samples of the respective time-domain signals $R_{1,j,k}$ and $R_{2,j,k}$ during a sampling window 56, 58, respectively. Sampling window 56, 58 remains "open" for a discrete period of time, during which a fixed number of samples of the received time-domain signal can be taken at a particular sampling rate. The duration between samples is the "sampling period," and the sum of all sampling periods equals the duration of respective sampling window 56, 58. The lengths of the sampling periods are controlled by a sampling clock, which also determines the sampling rate. The sampling clock can be advanced or delayed as will be described below.

The signal sampled in each window 56, 58 defines a sequence that is passed to a respective fast Fourier transform (FFT) unit 60, 62 for processing in the frequency domain. In the example of FIG. 15, phase correction blocks 68, 70 multiply the received signals by $e^{-j(n\hat{\phi}_s+\hat{\phi}_c)}$, where $\hat{\phi}_s$ and $\hat{\phi}_c$ are the lowpass filtered and accumulated phase error estimates $\Delta\phi_s$ and $\Delta\phi_c$, respectively. Hence, each phase correction block 68, 70 performs two distinct forms of phase correction for subsequent observation samples based on estimated phase error. One form of phase error is carrier phase error, $\Delta\phi_c$, which results from discrepancy between the transmitter carrier frequency and the free-running oscillator frequency of the receiver. Carrier phase error affects demodulation of all signals that may be carried by the carrier, and affects the signals equally. A second form of phase error is sampling phase error, $\Delta\phi_s$, which results from discrepancy between sampling frequencies of the transmitter and receiver. Sampling phase error does not affect all signals equally. Rather, the amount of sampling phase error depends upon the sub-carrier bin of the signal to be recovered.

To compensate for sampling phase error, $\Delta\phi_s$, each phase correction block 68, 70 multiplies the input signal by $e^{-j(n\hat{\phi}_s)}$ to adjust the respective sampling window 56, 58. When the sampling phase to be corrected is larger than $\pi$ or smaller than $-\pi$, the window position is shifted backward or forward, respectively, by one sample and the phase to be corrected is added by $-2\pi$ or $2\pi$, respectively. To compensate for carrier phase error, $\Delta\phi_c$, phase correction block 68, 70 multiplies the input signal by $e^{-j(\hat{\phi}_c)}$. A phase error estimator 74 generates phase error values $\Delta\phi_c$ and $\Delta\phi_s$. Loop filters 76, 78 have lowpass characteristics to remove the fast varying phase error components of phase error values $\Delta\phi_c$ and $\Delta\phi_s$, respectively.

Voltage controlled oscillators (VCO) 80, 82 receive the filtered output signals from loop filters 76, 78, respectively. Loop filters 76, 78 and VCO elements 80, 82 act independently, but may operate in a substantially similar fashion. The loop filter/VCO elements 50 and 54, respectively, receive an estimated instantaneous carrier phase error, denoted $\Delta\hat{\phi}_c$, and an estimated instantaneous sampling phase error (58), denoted $\Delta\hat{\phi}_s$, from phase error estimator 74. VCOs 80, 82 serve as digital emulators of the analog counterparts, which perform accumulation of input signals, and apply low pass filter and accumulated phase error signals $\hat{\phi}_s$ and $\hat{\phi}_c$ to phase correction blocks 68, 70.

Channel estimation blocks 64, 66 provide estimates of the channel response for each transmission channel carrying signals $R_{1,j,k}$ and $R_{2,j,k}$, respectively. Branch metric calculator 72 generates soft decision output codes $\Lambda(b_l-bn)$ based on the phase corrected sequences generated by phase correction blocks 68, 70, and the channel estimation values produced by channel estimators 64, 66. A slicer block 84 generates hard decisions based on the transmitted coded bits produced by branch metric calculator 72. Mapping block 86 then translates a finite number of bits from the coded bits to a transmitted symbol. Thus, the output of mapping block 86 is the estimate of the transmitted symbol. Phase error estimator 74 receives the estimated transmitted symbol from mapping element 86 and the joint phase corrected and equalized signal u*H from branch metric calculator 72, and produces sampling and carrier phase error values $\Delta\phi_c$ and $\Delta\phi_s$. Hence, phase error estimator 74 can be referred to as a soft decision-directed phase error estimator in the sense that it is responsive to the output of branch metric calculator 72. The structure and function of phase error estimator 74 will be described in greater detail below.

As mentioned above, loop filter 76 and VCO 80, which track sampling phase error, may include additional functionality. In particular, loop filter 76 and VCO 80 can be constructed to include window adjustment circuitry that applies the estimated sampling phase error $\hat{\phi}_s$ to adjust windows 56, 58. When $\hat{\phi}_s$ is larger than $\pi$ radians or smaller than $-\pi$ radians, advance/delay signals 83 are generated to adjust sampling windows 56, 58. When $\hat{\phi}_s$ is larger than $\pi$, windows 56, 58 are lagged by one sampling period, and $\hat{\phi}_s$ is set to $-2\pi+\hat{\phi}_s$. When $\hat{\phi}_s$ is smaller than $-\pi$, windows 56, 58 are adjusted in the other direction by one sampling period and $\hat{\phi}_s$ is set to $2\pi+\hat{\phi}_s$. In this way, $\hat{\phi}_s$ remains between $-\pi$ radians and $\pi$ radians.

The number of samples taken in sampling windows 56, 58 remains unchanged, but the windows are advanced or delayed by one sampling period with each adjustment. In other words, window adjustment is performed in the time domain. The sampler may include an increment/decrement controller that responds to advance/delay signal 83. Notably, window adjustment is performed when needed to keep $\hat{\phi}_s$ between $-\pi$ radians and $\pi$ radians, and is not necessarily performed after each sampling. Because the effect of the window adjustments is observed at the input of phase correction elements 68, 70 with some time delay associated with FFTs 60, 62, the sampling phase error estimate supplied to phase correction elements 68, 70 may be adjusted with the same delay to either $-2\pi+\hat{\phi}_s$ or $2\pi+\hat{\phi}_s$.

Figure 16:
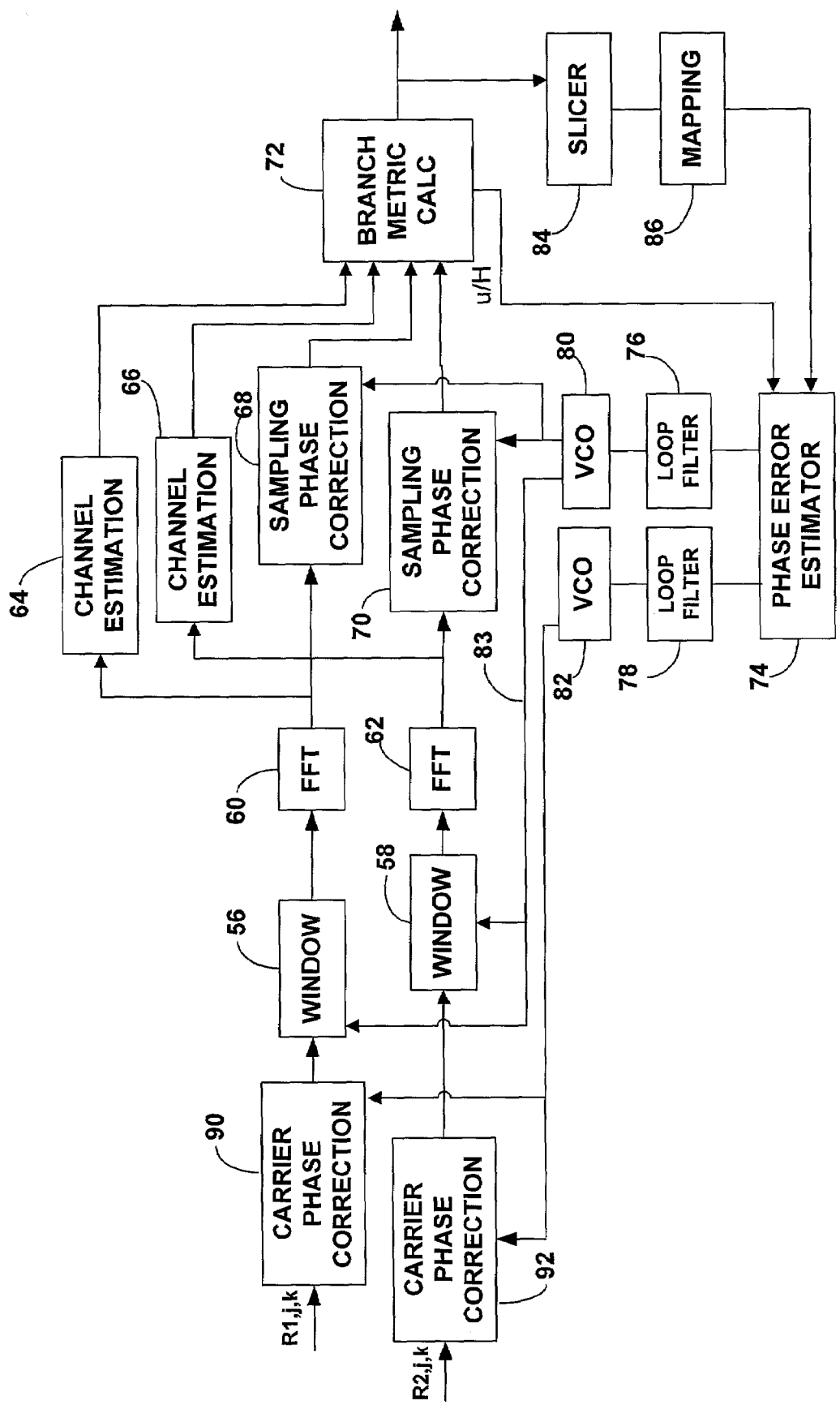
FIG. 16 is a block diagram illustrating an alternative phase locked loop with time and frequency domain correction.

FIG. 16 is a block diagram illustrating an alternative phase locked loop 88 with time and frequency domain correction. Phase locked loop 88 conforms substantially to phase locked loop 55 of FIG. 15. However, the carrier and sampling phase error correction features are decoupled. In particular, phase error estimator 74 is configured as in FIG. 15 to produce a sampling phase error value $\Delta\phi_s$ and a carrier phase error value $\Delta\phi_c$. However, loop filter 78 and VCO 82 feed the low pass filtered carrier phase error value $\hat{\phi}_c$ to independent carrier phase estimation blocks 90, 92 that precede the sampler for each receive diversity path. In this manner, the incoming signals $R_{1,j,k}$ and $R_{2,j,k}$ are corrected for carrier phase error prior to sampling in windows 56, 58 and demodulation by FFTs 60, 62, providing a phase error correction in the time domain. Loop filter 76 and VCO 80 then feed the sampling phase error $\hat{\phi}_s$ to sampling phase correction blocks 68, 70, as well as advance/delay signals 83 to adjust sampling windows 56, 58.

Figure 17:
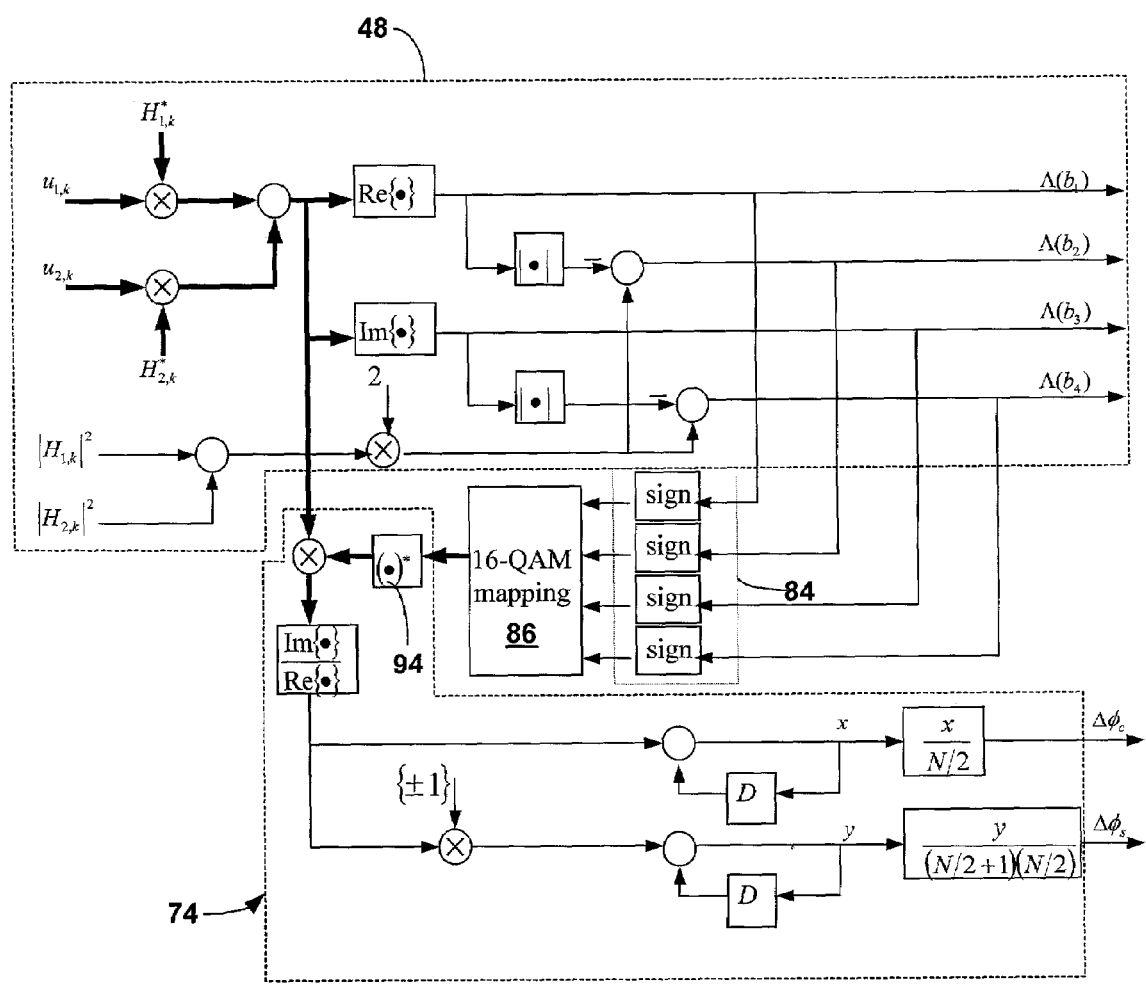
FIG. 17 is a block diagram illustrating implementation of an exemplary phase error estimator for use in a phase locked loop as shown in FIG. 15 or FIG. 16.

FIG. 17 is a block diagram illustrating implementation of phase error estimators performing calculations as represented in expressions (54) and (55) above. A 16-QAM embodiment will be described herein to illustrate a joint implementation of a soft demapper and a phase error estimator. As shown in FIG. 17, a soft demapper unit 48 for 16-QAM (FIG. 11) is integrated with a set of elements forming a phase error estimator 74. Again, the exemplary implementation of phase error estimator 74 in FIG. 17 is designed to implement the phase error estimations of expressions (54) and (55). To that end, slicer block 84 includes sign comparators for 16-QAM soft decisions $\Lambda(b_1)$, $\Lambda(b_2)$, $\Lambda(b_3)$ and $\Lambda(b_4)$.

A 16-QAM mapping unit 86 maps the hard decisions from slicer block 84 to produce a transmitted symbol. Following the complex conjugate operation (94), the transmitted symbol is multiplied with the combined demodulated and equalized signal u/H and applied to phase error estimator 74. Phase error estimator 74, as shown in FIG. 17, extracts the real and imaginary components of the resulting u*H signal and implements the calculations set forth in expressions (54) and (55) to produce carrier phase error $\Delta\hat{\phi}_c$ and sampling phase error $\Delta\hat{\phi}_s$. With phase error estimator 74 implemented as shown in FIG. 17, each component of the phase errors can be estimated throughout the sub-carriers as represented below:

$$\Delta\phi_c = \frac{1}{(N/2)} \sum_{n=1}^{N/2} \left( \frac{\text{Im}\left(\sum_{i=1}^{L} u_{i,n} \cdot H^*_{i,n} \cdot S^*_n\right)}{\text{Re}\left(\sum_{i=1}^{L} u_{i,n} \cdot H^*_{i,n} \cdot S^*_n\right)} + \frac{\text{Im}\left(\sum_{i=1}^{L} u_{i,-n} \cdot H^*_{i,-n} \cdot S^*_{-n}\right)}{\text{Re}\left(\sum_{i=1}^{L} u_{i,-n} \cdot H^*_{i,-n} \cdot S^*_{-n}\right)} \right) \text{ and} \quad (54)$$

$$\Delta\phi_s = \frac{1}{(N/2+1)(N/2)} \sum_{n=1}^{N/2} \left( \frac{\text{Im}\left(\sum_{i=1}^{L} u_{i,n} \cdot H^*_{i,n} \cdot S^*_n\right)}{\text{Re}\left(\sum_{i=1}^{L} u_{i,n} \cdot H^*_{i,n} \cdot S^*_n\right)} - \frac{\text{Im}\left(\sum_{i=1}^{L} u_{i,n-N/2-1} \cdot H^*_{i,n-N/2-1} \cdot S^*_{n-N/2-1}\right)}{\text{Re}\left(\sum_{i=1}^{L} u_{i,n-N/2-1} \cdot H^*_{i,n-N/2-1} \cdot S^*_{n-N/2-1}\right)} \right). \quad (55)$$

Figure 18:
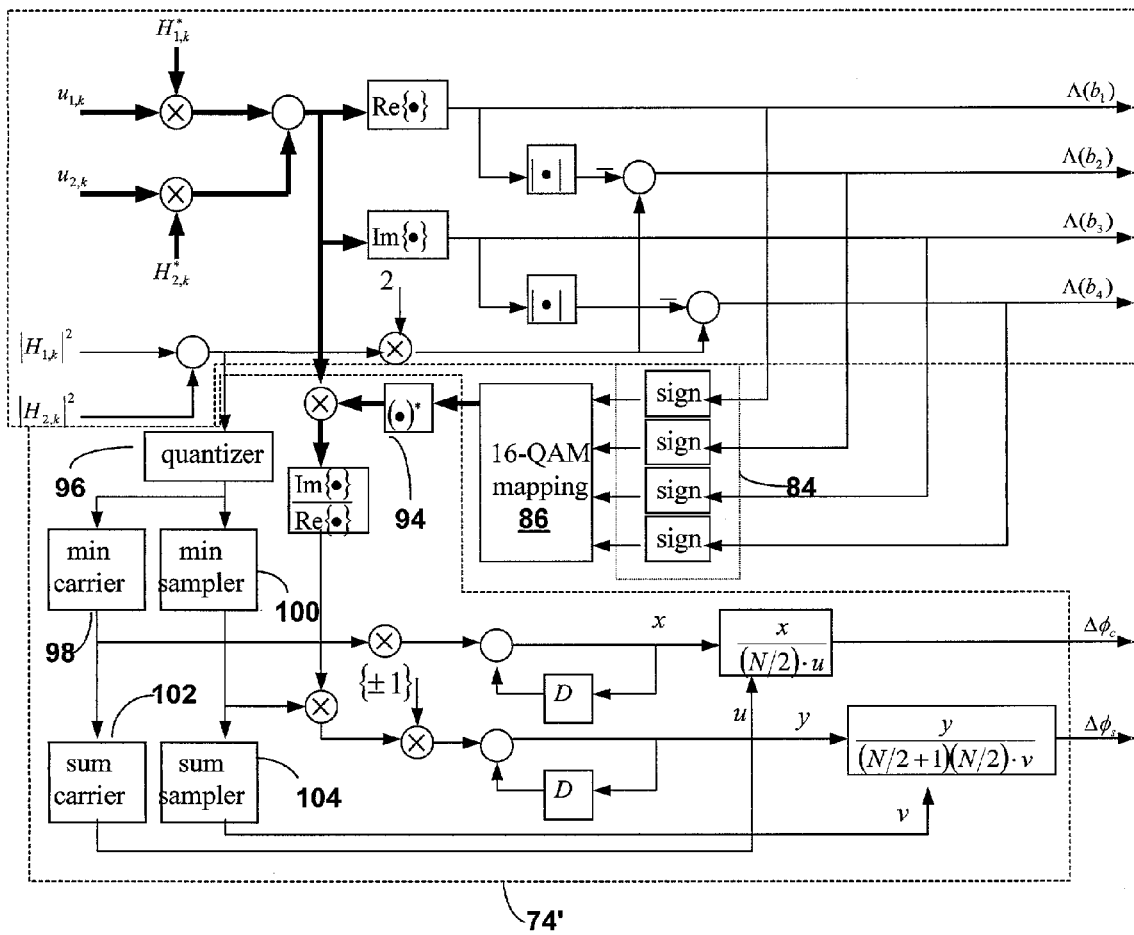
FIG. 18 is a block diagram illustrating implementation of an alternative phase error estimator for use in a phase locked loop as shown in FIG. 15 or FIG. 16.

FIG. 18 is a block diagram illustrating implementation of a phase error estimator 74' performing calculations as indicated in expressions (58) and (59) above. Phase error estimator 74' conforms substantially to phase error estimator 74 of FIG. 17, and is provided for a 16-QAM example. However, phase error estimator 74' further includes a quantizer block 96 that quantizes the weight of $|H_{i,k}|^2+|H_{2,k}|^2$ to the nearest power of two value. Quantization can help to reduce hardware complexity. Min carrier block 98 calculates:

$$\min\left(\text{quantize}\left(\sum_{i=1}^{L} |H_{i,n}|^2\right), \text{quantize}\left(\sum_{i=1}^{L} |H_{i,-n}|^2\right)\right) \text{ for } 1 \le n \le \frac{N}{2}.$$

Min sampler block 100 calculates:

$$\min\left(\text{quantize}\left(\sum_{i=1}^{L} |H_{i,n}|^2\right), \text{quantize}\left(\sum_{i=1}^{L} |H_{i,n-N/2-1}|^2\right)\right)$$

for $1 \le n \le \frac{N}{2}$.

Sum carrier block 102 and sum sampler block 104 calculate:

$$\sum_{n=1}^{N/2} \min\left(\text{quantize}\left(\sum_{i=1}^{L} |H_{i,n}|^2\right), \text{quantize}\left(\sum_{i=1}^{L} |H_{i,-n}|^2\right)\right) \text{ and}$$

$$\sum_{n=1}^{N/2} \min\left(\text{quantize}\left(\sum_{i=1}^{L} |H_{i,n}|^2\right),\right.$$

$$\left.\text{quantize}\left(\sum_{i=1}^{L} |H_{i,n-N/2-1}|^2\right)\right), \text{ respectively.}$$

The carrier and sampler blocks 98, 100, 102, 104 provide additional inputs that enable phase error estimator 74' to perform the calculations in expressions (58) and (59) as indicated below:

$$\Delta\phi_c = \frac{1}{(N/2)\cdot sumw_c}\sum_{n=1}^{N/2} \tag{58}$$

$$\left(\frac{\text{Im}\left(\sum_{i=1}^{L} u_{i,n}\cdot H_{i,n}^*\cdot S_n^*\right)}{\text{Re}\left(\sum_{i=1}^{L} u_{i,n}\cdot H_{i,n}^*\cdot S_n^*\right)} + \frac{\text{Im}\left(\sum_{i=1}^{L} u_{i,-n}\cdot H_{i,-n}^*\cdot S_{-n}^*\right)}{\text{Re}\left(\sum_{i=1}^{L} u_{i,-n}\cdot H_{i,-n}^*\cdot S_{-n}^*\right)}\right)\cdot$$

$$\min\left(\sum_{i=1}^{L} |H_{i,n}|^2, \sum_{i=1}^{L} |H_{i,-n}|^2\right)$$

$$\Delta\phi_s = \frac{1}{(N/2+1)(N/2)\cdot sumw_s}\sum_{n=1}^{N/2} \tag{59}$$

$$\left(\frac{\text{Im}\left(\sum_{i=1}^{L} u_{i,n}\cdot H_{i,n}^*\cdot S_n^*\right)}{\text{Re}\left(\sum_{i=1}^{L} u_{i,n}\cdot H_{i,n}^*\cdot S_n^*\right)} - \frac{\text{Im}\left(\sum_{i=1}^{L} u_{i,n-N/2-1}\cdot H_{i,n-N/2-1}^*\cdot S_{n-N/2-1}^*\right)}{\text{Re}\left(\sum_{i=1}^{L} u_{i,n-N/2-1}\cdot H_{i,n-N/2-1}^*\cdot S_{n-N/2-1}^*\right)}\right)\cdot$$

$$\min\left(\sum_{i=1}^{L} |H_{i,n}|^2, \sum_{i=1}^{L} |H_{i,n-N/2-1}|^2\right)$$

where $sumw_c = \sum_{n=1}^{N/2} \min\left(\sum_{i=1}^{L} |H_{i,n}|^2, \sum_{i=1}^{L} |H_{i,-n}|^2\right)$ and $$sumw_s = \sum_{n=1}^{N/2} \min\left(\sum_{i=1}^{L} |H_{i,n}|^2, \sum_{i=1}^{L} |H_{i,n-N/2-1}|^2\right).$$

Figure 19:
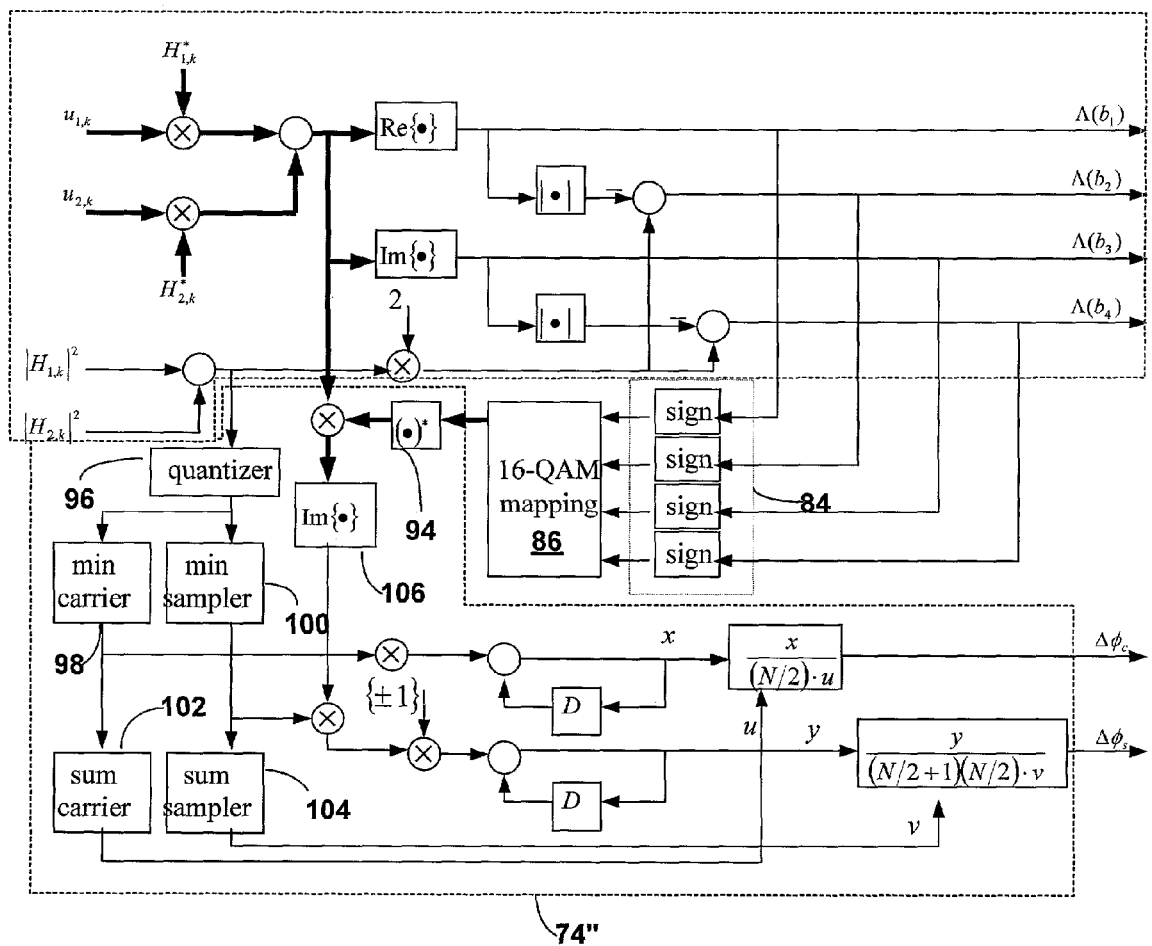
FIG. 19 is a block diagram illustrating implementation of another alternative phase error estimator for use in a phase locked loop as shown in FIG. 15 or FIG. 16.

FIG. 19 is a block diagram illustrating an example implementation of a phase error estimator 74'' for performing calculations as indicated in expressions (60) and (61) above. Phase error estimator 74'' conforms almost identically to phase error estimator 74' of FIG. 18. Instead of extracting the real and imaginary components of the input signal, however, phase error estimator 74'' extracts only the imaginary component (106). Again, the phase error is small under normal operating conditions. As a result, the imaginary part of $$\sum_{i=1}^{L} u_{i,n}\cdot H_{i,n}^*\cdot S_n^*$$

is much smaller than the real part, so a phase error estimate proportional to the actual phase error can be obtained using phase error estimator 74'' according to the expressions:

$$\Delta\phi_c = \frac{1}{(N/2)\cdot sumw_c}\sum_{n=1}^{N/2} \tag{60}$$

$$\left(\text{Im}\left(\sum_{i=1}^{L} u_{i,n}\cdot H_{i,n}^*\cdot S_n^*\right) + \text{Im}\left(\sum_{i=1}^{L} u_{i,-n}\cdot H_{i,-n}^*\cdot S_{-n}^*\right)\right)\cdot$$

$$\min\left(\sum_{i=1}^{L} |H_{i,n}|^2, \sum_{i=1}^{L} |H_{i,-n}|^2\right)$$

$$\Delta\phi_s = \frac{1}{(N/2+1)(N/2)\cdot sumw_s}\sum_{n=1}^{N/2} \tag{61}$$

$$\left(\text{Im}\left(\sum_{i=1}^{L} u_{i,n}\cdot H_{i,n}^*\cdot S_n^*\right) - \text{Im}\left(\sum_{i=1}^{L} u_{i,n-N/2-1}\cdot H_{i,n-N/2-1}^*\cdot S_{n-N/2-1}^*\right)\right)\cdot$$

$$\min\left(\sum_{i=1}^{L} |H_{i,n}|^2, \sum_{i=1}^{L} |H_{i,n-N/2-1}|^2\right)$$

Figure 20:
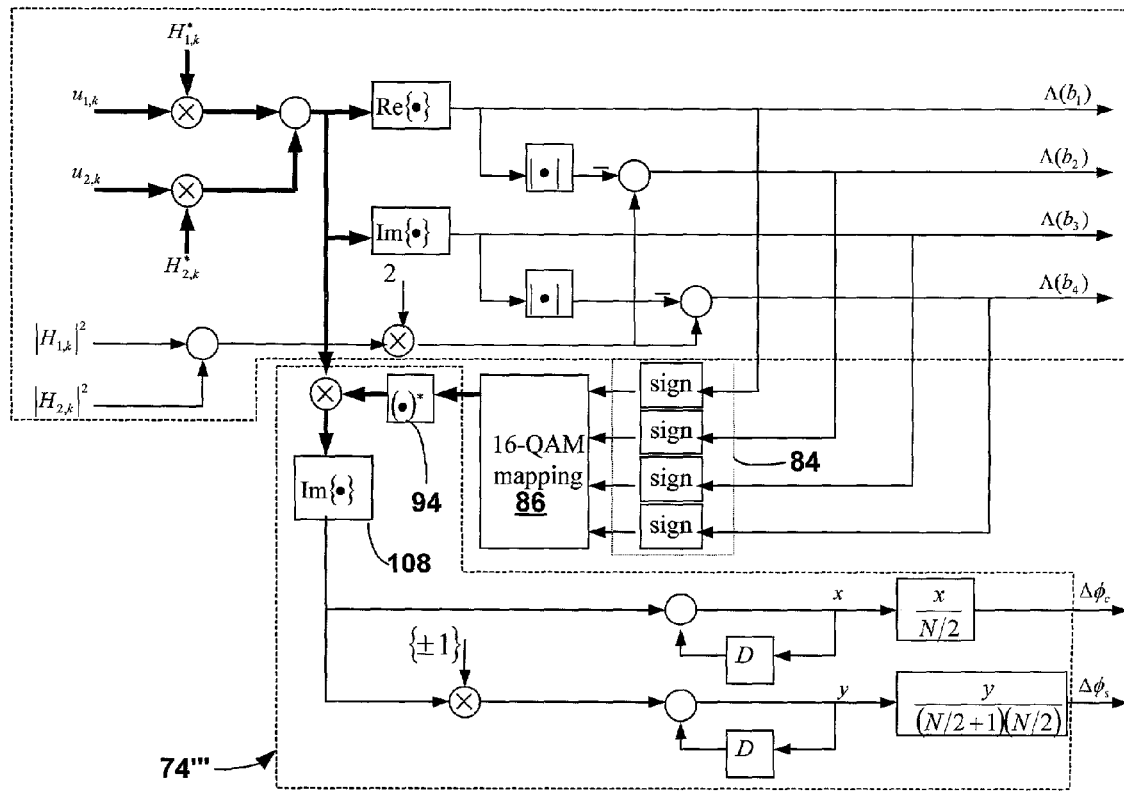
FIG. 20 is a block diagram illustrating implementation of a further alternative phase error estimator for use in a phase locked loop as shown in FIG. 15 or FIG. 16.

FIG. 20 is a block diagram illustrating an example implementation of a phase error estimator 74''' for performing calculations as indicated in expressions (62) and (63) above. Phase error estimator 74''' conforms almost identically to phase error estimator 74 of FIG. 17. Instead of extracting the real and imaginary components of the input signal, however, phase error estimator 74''' extracts only the imaginary component (108). The implementation shown in FIG. 20 enables calculations of phase error estimates according to the following expressions:

$$\Delta\phi_c = \frac{1}{(N/2)}\sum_{n=1}^{N/2}\left(\text{Im}\left(\sum_{i=1}^{L} u_{i,n}\cdot H_{i,n}^*\cdot S_n^*\right) + \text{Im}\left(\sum_{i=1}^{L} u_{i,-n}\cdot H_{i,-n}^*\cdot S_{-n}^*\right)\right) \tag{62}$$

$$\Delta\phi_s = \frac{1}{(N/2+1)(N/2)}\sum_{n=1}^{N/2}\left(\text{Im}\left(\sum_{i=1}^{L} u_{i,n}\cdot H_{i,n}^*\cdot S_n^*\right) - \text{Im}\left(\sum_{i=1}^{L} u_{i,n-N/2-1}\cdot H_{i,n-N/2-1}^*\cdot S_{n-N/2-1}^*\right)\right) \tag{63}$$

Figure 21:
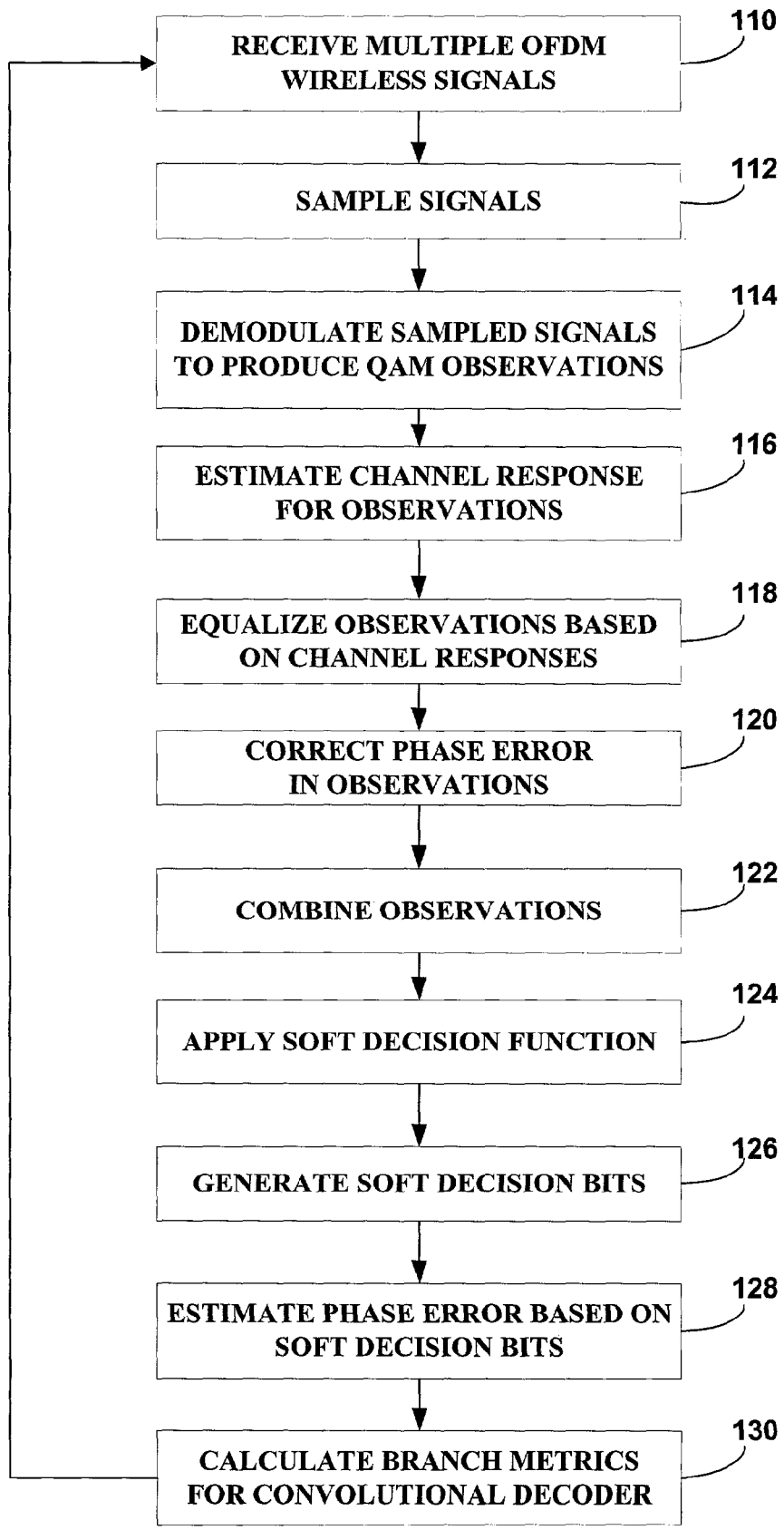
FIG. 21 is a flow diagram illustrating joint performance of equalization, soft-demapping and phase error estimation functions.

FIG. 21 is a flow diagram illustrating joint performance of equalization, soft-demapping and phase error estimation functions. The method illustrated in FIG. 21 may make use of various hardware and functional embodiments described herein. As shown in FIG. 21, a method for equalization, soft-demapping and phase error estimation involves receiving wireless signals via multiple antennas (110), sampling the signals with an analog-to-digital converter according to an FFT sampling window (112), and demodulating the sampled wireless signals to produce observations of quadrature amplitude modulation (QAM) symbols (114).

Upon estimating the channel responses for the signal paths associated with the antennas (116), the method involves equalizing each of the QAM symbol observations based on estimated channel responses (118). The QAM symbol observations are corrected for phase error (120), preferably including both carrier phase error and sampling phase error. The method then involves combining the QAM symbol observations (122), followed by application of a soft decision function (124) to carry out generation of soft decision bits (128), i.e., performance of the soft demapping function. Using the soft decision bits, the method further involves estimating phase error (128). This estimate can be used to make sampling phase error and carrier phase error adjustments, i.e., corrections, for subsequent observation samples. Then, branch metrics for the convolutional decoder are calculated using the soft decision bits (130), and the process repeats for subsequent samples.

The various components described herein for joint equalization, soft demapping and phase error estimation may be formed by a variety of hardware such as integrated logic circuitry, e.g., an Application Specific Integrated Circuit (ASIC), programmable logic devices, microprocessors, and the like. For size and complexity reasons, it is desirable that the various equalizations, soft demapping and phase error estimation circuitry be formed together within a common hardware device such as an ASIC.

Various embodiments of the invention have been described. These and other embodiments are within the scope of the following claims.

The invention claimed is:

1. A method comprising:
receiving wireless signals via multiple antennas;
demodulating the wireless signals to produce observations of a transmitted symbol;
weighting each of the observations with a complex-conjugate of a channel response for the corresponding antenna;
combining the weighted observations to form a combined observation;
generating one or more soft decision bits indicative of the transmitted symbol for a real component of the combined observation according to soft demapping rules based on a subset of the transmitted symbol; and
generating one or more soft decision bits indicative of the transmitted symbol for an imaginary component of the combined observation according to the soft demapping rules based on a subset of the transmitted symbol constellation.

2. The method of claim 1, wherein the soft demapping rules are based on a first minimum distance symbol associated with bit 1 and a second minimum distance symbol associated with bit 0.

3. The method of claim 2, wherein the minimum distance symbols are constrained to be within a predetermined distance of an inter-bit decision boundary.

4. The method of claim 1, wherein the soft demapping rules are based on piecewise linear functions.

5. The method of claim 1, wherein the soft demapping rules are based on piecewise linear functions of the real and imaginary components of the combined observation and a combined energy of the channel responses for the multiple antennas.

6. The method of claim 5, further comprising computing one or more of the soft decisions recursively based on previously computed soft decisions.

7. A method comprising:
receiving wireless signals via multiple antennas;
demodulating the wireless signals to produce observations of a transmitted symbol;
weighting each of the observations with a complex-conjugate of a channel response for the corresponding antenna;
combining the weighted observations to form a combined observation;
generating one or more soft decision bits indicative of the transmitted symbol for the combined observation according to soft demapping rules based on a subset of the transmitted symbol constellation; and
estimating a combined phase error including carrier phase error and sampling phase error for the combined observation using either the transmitted symbol estimated based on the soft decision bits or a predetermined symbol transmitted via a pilot tone.

8. The method of any of claims 1 to 6, wherein the wireless signals are multi-carrier (MC) signals, the method further comprising applying a Fourier transform function to obtain the observations of the transmitted symbol.

9. A method comprising:
receiving wireless signals via multiple antennas;
demodulating the wireless signals to produce observations of a transmitted symbol;
weighting each of the observations with a complex-conjugate of a channel response for the corresponding antenna;
combining the weighted observations to form a combined observation;
generating one or more soft decision bits indicative of the transmitted symbol for the combined observation according to soft demapping rules based on a subset of the transmitted symbol constellation; and
estimating a combined phase error including carrier phase error and sampling phase error for the combined observation using either the transmitted symbol estimated based on the soft decision bits or a predetermined symbol transmitted via a pilot tone, wherein generating the one or more soft decision bits and estimating the combined phase error are performed jointly within shared hardware.

10. A method comprising:
receiving orthogonal frequency division multiplexing (OFDM) wireless signals via multiple antennas;
demodulating and performing fast Fourier transform (FFT) functions on the wireless signals to produce observations of a transmitted quadrature amplitude modulated (QAM) symbol;
weighting each of the observations with a complex-conjugate of a channel response for the corresponding antenna;
combining the weighted observations to form a combined observation;
generating one or more soft decision bits indicative of the transmitted QAM symbol for a real component of the combined observation according to soft demapping rules based on a subset of the transmitted QAM symbol constellation; and
generating one or more soft decision bits indicative of the transmitted QAM symbol for an imaginary component of the combined observation according to soft demapping rules based on a subset of the transmitted QAM symbol constellation.

11. The method of claim 10, wherein the soft demapping rules are based on a first minimum distance symbol associated with bit 1 and a first minimum distance symbol associated with bit 0.

12. The method of claim 10, wherein the minimum distance symbols are constrained to be within a predetermined distance of an inter-bit decision boundary.

13. The method of claim 10, wherein the soft demapping rules are based on piecewise linear functions.

14. The method of claim 10, wherein the soft demapping rules are based on piecewise linear functions of the real and imaginary components of the combined observation and a combined energy of the channel responses for the multiple antennas.

15. The method of claim 14, further comprising computing one or more of the soft decisions recursively based on previously computed soft decisions.

16. A method comprising:
receiving orthogonal frequency division multiplexing (OFDM) wireless signals via multiple antennas;
demodulating and performing fast Fourier transform (FFT) functions on the wireless signals to produce observations of a transmitted Quadrature amplitude modulated (QAM) symbol:
weighting each of the observations with a complex-conjugate of a channel response for the corresponding antenna;
combining the weighted observations to form a combined observation;
generating one or more soft decision bits indicative of the transmitted QAM symbol for the combined observation according to soft demapping rules based on a subset of the transmitted QAM symbol constellation; and
estimating a combined phase error including carrier phase error and sampling phase error for the combined observation using either the transmitted symbol estimated based on the soft decision bits or a predetermined symbol transmitted via a pilot tone.

17. A method comprising:
receiving orthogonal frequency division multiplexing (OFDM) wireless signals via multiple antennas;
demodulating and performing fast Fourier transform (FFT) functions on the wireless signals to produce observations of a transmitted Quadrature amplitude modulated (QAM) symbol;
weighting each of the observations with a complex-conjugate of a channel response for the corresponding antenna;
combining the weighted observations to form a combined observation;
generating one or more soft decision bits indicative of the transmitted QAM symbol for the combined observation according to soft demapping rules based on a subset of the transmitted QAM symbol constellation;
estimating a combined phase error including carrier phase error and sampling phase error for the combined observation using either the transmitted symbol estimated based on the soft decision bits or a predetermined symbol transmitted via a pilot tone;
estimating the carrier phase error by summing the estimated combined phase errors that correspond to complementary subcarriers in the wireless signals to remove the sampling phase error; and
estimating the sampling phase error by subtracting the estimated combined phase error that corresponds to one of the subcarriers from the estimated combined phase error that corresponds to another of the subcarriers.

18. The method of claim 17, further comprising:
adjusting an FFT sampling window for each of the wireless signals based on the sampling phase error; and
applying a frequency domain correction to subsequent observations based on the carrier phase error and sampling phase error.

19. The method of claim 17, further comprising applying a time domain correction to subsequent observations based on the carrier phase error and sampling phase error.

20. The method of claim 17, further comprising:
adjusting an FFT sampling window for each of the wireless signals based on the sampling phase error;
applying a time domain correction to subsequent observations based on the carrier phase error; and
applying a frequency domain correction to subsequent observations based on the sampling phase error.

21. The method of claim 17, further comprising performing the generation and estimation functions jointly within shared hardware.

22. The method of claim 17, wherein estimating the carrier phase error includes summing the estimated combined phase errors that correspond to multiple pairs of complementary subcarriers, and averaging the resulting sums.

23. The method of claim 22, wherein averaging includes weighting each of the estimated combined phase errors according to at least one of an estimated combined signal-to-noise ratio for the antennas and an estimated power of the transmitted symbol.

24. The method of claim 22, further comprising selecting subcarriers having energy levels above a threshold, and using the selected subcarriers to choose the pairs of complementary subcarriers used to estimate the carrier phase error.

25. The method of claim 17, wherein estimating the sampling phase error includes subtracting the estimated combined phase errors that correspond to multiple pairs of subcarriers, and averaging the resulting differences.

26. The method of claim 25, wherein averaging includes weighting each of the estimated combined phase errors according to at least one of: an estimated combined signal-to-noise ratio for the antennas or an estimated power of the transmitted symbol.

27. The method of claim 25, further comprising selecting subcarriers having energy levels above a threshold, and using the selected subcarriers to choose the pairs of subcarriers used to estimate the sampling phase error.

28. The method of any of claims 10 to 15, wherein the wireless signals are transmitted according to the IEEE 802.11a standard.

29. A method comprising:
receiving an orthogonal frequency division multiplexing (OFDM) wireless signal via a first antenna;
receiving the orthogonal frequency division multiplexing (OFDM) wireless signal via a second antenna;
demodulating and performing fast Fourier transform (FFT) functions on the wireless signal received by the first antenna to produce a first observation of a transmitted quadrature amplitude modulated (QAM) symbol;
demodulating and performing fast Fourier transform (FFT) functions on the wireless signal received by the second antenna to produce a second observation of the transmitted quadrature amplitude modulated (QAM) symbol;
weighting the first observation with a complex-conjugate of a channel response for the first antenna;
weighting the second observation with a complex-conjugate of a channel response for the second antenna;
combining the weighted first observation and the weighted second observation to form a combined observation;
generating one or more soft decision bits indicative of the transmitted QAM symbol for a real component of the combined observation according to soft demapping rules based on a subset of the transmitted QAM symbol constellation; and generating one or more soft decision bits indicative of the transmitted QAM symbol for an imaginary component of the combined observation according to soft demapping rules based on a subset of the transmitted QAM symbol constellation.

30. The method of claim 29, wherein the soft demapping rules are based on a first minimum distance symbol associated with bit 1 and a first minimum distance symbol associated with bit 0.

31. The method of claim 29, wherein the minimum distance symbols are constrained to be within a predetermined distance of an inter-bit decision boundary.

32. The method of claim 29, wherein the soft demapping rules are based on piecewise linear functions.

33. The method of claim 29, wherein the soft demapping rules are based on piecewise linear functions of the real and imaginary components of the combined observation and a combined energy of the channel responses for the multiple antennas.

34. The method of claim 33, further comprising computing one or more of the soft decisions recursively based on previously computed soft decisions.

35. A method comprising:
receiving an orthogonal frequency division multiplexing (OFDM) wireless signal via a first antenna;
receiving the orthogonal frequency division multiplexing (OFDM) wireless signal via a second antenna;
demodulating and performing fast Fourier transform (FFT) functions on the wireless signal received by the first antenna to produce a first observation of a transmitted Quadrature amplitude modulated (QAM) symbol;
demodulating and performing fast Fourier transform (FFT) functions on the wireless signal received by the second antenna to produce a second observation of the transmitted quadrature amplitude modulated (QAM) symbol;
weighting the first observation with a complex-conjugate of a channel response for the first antenna;
weighting the second observation with a complex-conjugate of a channel response for the second antenna;
combining the weighted first observation and the weighted second observation to form a combined observation;
generating one or more soft decision bits indicative of the transmitted QAM symbol for the combined observation according to soft demapping rules based on a subset of the transmitted QAM symbol constellation;
estimating a combined phase error including carrier phase error and sampling phase error for the combined observation using either the transmitted symbol estimated based on the soft decision bits or a predetermined symbol transmitted via a pilot tone;
estimating the carrier phase error by summing the estimated combined phase errors that correspond to complementary subcarriers in the wireless signals to remove the sampling phase error; and
estimating the sampling phase error by subtracting the estimated combined phase error that corresponds to one of the subcarriers from the estimated combined phase error that corresponds to another of the subcarriers.

36. A method comprising:
receiving an orthogonal frequency division multiplexing (OFDM) wireless signal via a first antenna;
receiving the orthogonal frequency division multiplexing (OFDM) wireless signal via a second antenna;
demodulating and performing fast Fourier transform (FFT) functions on the wireless signal received by the first antenna to produce a first observation of a transmitted Quadrature amplitude modulated (QAM) symbol;
demodulating and performing fast Fourier transform (FFT) functions on the wireless signal received by the second antenna to produce a second observation of the transmitted Quadrature amplitude modulated (QAM) symbol;
weighting the first observation with a complex-conjugate of a channel response for the first antenna;
weighting the second observation with a complex-conjugate of a channel response for the second antenna;
combining the weighted first observation and the weighted second observation to form a combined observation;
generating one or more soft decision bits indicative of the transmitted QAM symbol for the combined observation according to soft demapping rules based on a subset of the transmitted QAM symbol constellation;
estimating a combined phase error including carrier phase error and sampling phase error for the combined observation using either the transmitted symbol estimated based on the soft decision bits or a predetermined symbol transmitted via a pilot tone;
estimating the carrier phase error by summing the estimated combined phase errors that correspond to complementary subcarriers in the wireless signals to remove the sampling phase error;
estimating the sampling phase error by subtracting the estimated combined phase error that corresponds to one of the subcarriers from the estimated combined phase error that corresponds to another of the subcarriers;
adjusting an FFT sampling window for each of the wireless signals based on the sampling phase error; and
applying a frequency domain correction to subsequent observations based on the carrier phase error and sampling phase error.

37. The method of claim 36, further comprising applying a time domain correction to subsequent observations based on the carrier phase error and sampling phase error.

38. The method of claim 36, further comprising:
adjusting an FFT sampling window for each of the wireless signals based on the sampling phase error;
applying a time domain correction to subsequent observations based on the carrier phase error; and
applying a frequency domain correction to subsequent observations based on the sampling phase error.

39. The method of claim 36, further comprising performing the generation and estimation functions jointly within shared hardware.

40. The method of claim 36, wherein estimating the carrier phase error includes summing the estimated combined phase errors that correspond to multiple pairs of complementary subcarriers, and averaging the resulting sums.

41. The method of claim 40, wherein averaging includes weighting each of the estimated combined phase errors according to at least one of an estimated combined signal-to-noise ratio for the antennas and an estimated power of the transmitted symbol.

42. The method of claim 40, further comprising selecting subcarriers having energy levels above a threshold, and using the selected subcarriers to choose the pairs of complementary subcarriers used to estimate the carrier phase error.

43. The method of claim 36, wherein estimating the sampling phase error includes subtracting the estimated combined phase errors that correspond to multiple pairs of subcarriers, and averaging the resulting differences.

44. The method of claim 43, wherein averaging includes weighting each of the estimated combined phase errors according to at least one of: the estimated combined signal-to-noise ratio for the antennas or the estimated power of the transmitted symbol.

45. The method of claim 36, further comprising selecting subcarriers having energy levels above a threshold, and using the selected subcarriers to choose the pairs of subcarriers used to estimate the sampling phase error.

46. The method of any of claims 29 to 34, wherein the wireless signals are transmitted according to the IEEE 802.11a standard.

47. A method comprising:
receiving an orthogonal frequency division multiplexing (OFDM) wireless signal via an antenna;
demodulating and performing a fast Fourier transform (FFT) function on the wireless signal to produce an observation of a transmitted quadrature amplitude modulated (QAM) symbol;
weighting the observation with a complex-conjugate of a channel response for the antenna;
generating one or more soft decision bits indicative of the transmitted symbol for a real component of the weighted observation according to soft demapping rules based on a subset of the transmitted symbol constellation; and
generating one or more soft decision bits indicative of the transmitted symbol for an imaginary component of the weighted observation according to soft demapping rules based on a subset of the transmitted symbol constellation.

48. The method of claim 47, wherein the soft demapping rules are based on a first minimum distance symbol associated with bit 1 and a second minimum distance symbol associated with bit 0.

49. The method of claim 47, wherein the minimum distance symbols are constrained to be within a predetermined distance of an inter-bit decision boundary.

50. The method of claim 47, wherein the soft demapping rules are based on piecewise linear functions.

51. The method of claim 47, wherein the soft demapping rules are based on piecewise linear functions of the real and imaginary components of the weighted observation and the energy of the channel response.

52. The method of claim 51, further comprising computing one or more of the soft decisions recursively based on previously computed soft decisions.

53. A method comprising:
receiving an orthogonal frequency division multiplexing (OFDM) wireless signal via an antenna;
demodulating and performing a fast Fourier transform (FFT) function on the wireless signal to produce an observation of a transmitted Quadrature amplitude modulated (QAM) symbol;
weighting the observation with a complex-conjugate of a channel response for the antenna;
generating one or more soft decision bits indicative of the transmitted symbol for the weighted observation according to soft demapping rules based on a subset of the transmitted symbol constellation;
estimating a combined phase error including carrier phase error and sampling phase error for the weighted observation using either the transmitted symbol estimated based on the soft decision bits or a predetermined symbol transmitted via a pilot tone;
estimating the carrier phase error by summing the estimated combined phase errors that correspond to complementary subcarriers in the wireless signals to remove the sampling phase error; and
estimating the sampling phase error by subtracting the estimated combined phase error that corresponds to one of the subcarriers from the estimated combined phase error that corresponds to another of the subcarriers.

54. A method comprising:
receiving an orthogonal frequency division multiplexing (OFDM) wireless signal via an antenna;
demodulating and performing a fast Fourier transform (FFT) function on the wireless signal to produce an observation of a transmitted quadrature amplitude modulated (QAM) symbol;
weighting the observation with a complex-conjugate of a channel response for the antenna;
generating one or more soft decision bits indicative of the transmitted symbol for the weighted observation according to soft demapping rules based on a subset of the transmitted symbol constellation;
estimating a combined phase error including carrier phase error and sampling phase error for the weighted observation using either the transmitted symbol estimated based on the soft decision bits or a predetermined symbol transmitted via a pilot tone;
estimating the carrier phase error by summing the estimated combined phase errors that correspond to complementary subcarriers in the wireless signals to remove the sampling phase error;
estimating the sampling phase error by subtracting the estimated combined phase error that corresponds to one of the subcarriers from the estimated combined phase error that corresponds to another of the subcarriers;
adjusting an FFT sampling window for the wireless signal based on the sampling phase error; and
applying a frequency domain correction to subsequent observations based on the carrier phase error and sampling phase error.

55. The method of claim 54, further comprising applying a time domain correction to subsequent observations based on the carrier phase error and sampling phase error.

56. The method of claim 54, further comprising:
adjusting an FFT sampling window for the wireless signal based on the sampling phase error;
applying a time domain correction to subsequent observations based on the carrier phase error; and
applying a frequency domain correction to subsequent observations based on the sampling phase error.

57. The method of claim 54, further comprising performing the generation and estimation functions jointly within shared hardware.

58. The method of any of claims 47 to 52, wherein the wireless signal is transmitted according to the IEEE 802.11a standard.

59. A wireless receiver comprising:
multiple antennas that receive wireless signals;
a demodulator that demodulates the wireless signals to produce observations of a transmitted symbol;
an equalizer that weights each of the observations with a complex conjugate of an estimated channel response for the corresponding antenna; and
a soft demapper unit that combines the weighted observations to form a combined observation, generates one or more soft decision bits indicative of the transmitted symbol for a real component of the combined observation according to soft demapping rules based on a subset of the transmitted symbol constellation, and generates one or more soft decision bits indicative of the transmitted symbol for an imaginary component of the combined observation according to soft demapping rules based on a subset of the transmitted symbol constellation.

60. The receiver of claim 59, wherein the soft demapping rules are based on a first minimum distance symbol associated with bit 1 and a first minimum distance symbol associated with bit 0.

61. The receiver of claim 60, wherein the minimum distance symbols are constrained to be within a predetermined distance of an inter-bit decision boundary.

62. The receiver of claim 59, wherein the soft demapping rules are based on piecewise linear functions.

63. The receiver of claim 59, wherein the soft demapping rules are based on piecewise linear functions of the real and imaginary components of the combined observation and a combined energy of the channel responses for the multiple antennas.

64. The receiver of claim 63, wherein the soft demapper unit computes one or more of the soft decisions recursively based on previously computed soft decisions.

65. A wireless receiver comprising:
multiple antennas that receive wireless signals;
a demodulator that demodulates the wireless signals to produce observations of a transmitted symbol;
an equalizer that weights each of the observations with a complex conjugate of an estimated channel response for the corresponding antenna; and
a soft demapper unit that combines the weighted observations to form a combined observation, and generates one or more soft decision bits indicative of the transmitted symbol for the combined observation according to soft demapping rules based on a subset of the transmitted symbol constellation; and
a phase error estimator that estimates a combined phase error including carrier phase error and sampling phase error for the combined observation using either the transmitted symbol estimated based on the soft decision bits or a predetermined symbol transmitted via a pilot tone.

66. A wireless receiver comprising:
multiple antennas that receive wireless signals;
a demodulator that demodulates the wireless signals to produce observations of a transmitted symbol;
an equalizer that weights each of the observations with a complex conjugate of an estimated channel response for the corresponding antenna; and
a soft demapper unit that combines the weighted observations to form a combined observation, and generates one or more soft decision bits indicative of the transmitted symbol for the combined observation according to soft demapping rules based on a subset of the transmitted symbol constellation; and
a phase error estimator that estimates a combined phase error including carrier phase error and sampling phase error for the combined observation using either the transmitted symbol estimated based on the soft decision bits or a predetermined symbol transmitted via a pilot tone, wherein the soft demapper unit and the phase error estimator are provided jointly within shared hardware.

67. The receiver of any of claims 59 to 64, wherein the wireless signals are multi-carrier (MC) signals, the receiver further comprising applying a Fourier transform function to obtain the observations of the transmitted symbol.

68. A receiver comprising:
multiple antennas that receive orthogonal frequency division multiplexing (OFDM) wireless signals via multiple antennas;
a fast Fourier transform (FFT) unit that produce observations of a transmitted quadrature amplitude modulated (QAM) symbol from the wireless signals;
an equalizer that weights each of the observations with a complex-conjugate of a channel response for the corresponding antenna; and
a soft demapper unit that combines the weighted observations to form a combined observation, and generates one or more soft decision bits indicative of the transmitted QAM symbol for the combined observation according to soft demapping rules based on a subset of the transmitted QAM symbol constellation, and generates one or more soft decision bits indicative of the transmitted QAM symbol for an imaginary component of the combined observation according to soft demapping rules based on a subset of the transmitted QAM symbol constellation.

69. The receiver of claim 68, wherein the soft demapping rules are based on a first minimum distance symbol associated with bit 1 and a first minimum distance symbol associated with bit 0.

70. The receiver of claim 68, wherein the minimum distance symbols are constrained to be within a predetermined distance of an inter-bit decision boundary.

71. The receiver of claim 68, wherein the soft demapping rules are based on piecewise linear functions.

72. The receiver of claim 68, wherein the soft demapping rules are based on piecewise linear functions of the real and imaginary components of the combined observation and a combined energy of the channel responses for the multiple antennas.

73. The receiver of claim 72, wherein the soft demapper unit computes one or more of the soft decisions recursively based on previously computed soft decisions.

74. A receiver comprising:
multiple antennas that receive orthogonal frequency division multiplexing (OFDM) wireless signals via multiple antennas;
a fast Fourier transform (FFT) unit that produce observations of a transmitted quadrature amplitude modulated (QAM) symbol from the wireless signals;
an equalizer that weights each of the observations with a complex-conjugate of a channel response for the corresponding antenna; and
a soft demapper unit that combines the weighted observations to form a combined observation, and generates one or more soft decision bits indicative of the transmitted QAM symbol for the combined observation according to soft demapping rules based on a subset of the transmitted QAM symbol constellation; and
a phase error estimator that estimates a combined phase error including carrier phase error and sampling phase error for the combined observation using either the transmitted symbol estimated based on the soft decision bits or a predetermined symbol transmitted via a pilot tone.

75. A receiver comprising:
multiple antennas that receive orthogonal frequency division multiplexing (OFDM) wireless signals via multiple antennas;

a fast Fourier transform (FFT) unit that produce observations of a transmitted quadrature amplitude modulated (QAM) symbol from the wireless signals;

an equalizer that weights each of the observations with a complex-conjugate of a channel response for the corresponding antenna; and a soft demapper unit that combines the weighted observations to form a combined observation, and generates one or more soft decision bits indicative of the transmitted QAM symbol for the combined observation according to soft demapping rules based on a subset of the transmitted QAM symbol constellation; and a phase error estimator that estimates a combined phase error including carrier phase error and sampling phase error for the combined observation using either the transmitted symbol estimated based on the soft decision bits or a predetermined symbol transmitted via a pilot tone, wherein the phase error estimator estimates the carrier phase error by summing the estimated combined phase errors that correspond to complementary subcarriers in the wireless signals to remove the sampling phase error, and estimates the sampling phase error by subtracting the estimated combined phase error that corresponds to one of the subcarriers from the estimated combined phase error that corresponds to another of the subcarriers.

76. The receiver of claim 75, further comprising a phase error adjusting unit that adjusts an FFT sampling window for each of the wireless signals based on the sampling phase error, and applies a frequency domain correction to subsequent observations based on the carrier phase error and sampling phase error.

77. The receiver of claim 75, further comprising a phase error adjusting unit that applies a time domain correction to subsequent observations based on the carrier phase error and the sampling phase error.

78. The receiver of claim 75, further comprising a phase error adjusting unit that adjusts an FFT sampling window for each of the wireless signals based on the sampling phase error, applies a time domain correction to subsequent observations based on the carrier phase error, and applies a frequency domain correction to subsequent observations based on the sampling phase error.

79. The receiver of claim 75, wherein the soft demapper unit and the phase error estimator are provided jointly within shared hardware.

80. The receiver of claim 75, wherein the phase error estimator estimates the carrier phase error by summing the estimated combined phase errors that correspond to multiple pairs of complementary subcarriers, and averaging the resulting sums.

81. The receiver of claim 80, wherein averaging includes weighting each of the estimated combined phase errors according to at least one of an estimated combined signal-to-noise ratio for the antennas and an estimated power of the transmitted symbol.

82. The receiver of claim 80, wherein the phase error estimator selects subcarriers having energy levels above a threshold, and uses the selected subcarriers to choose the pairs of complementary subcarriers used to estimate the carrier phase error.

83. The receiver of claim 75, wherein the phase error estimator estimates the sampling phase error by subtracting the estimated combined phase errors that correspond to multiple pairs of subcarriers, and averaging the resulting differences.

84. The receiver of claim 83, wherein averaging includes weighting each of the estimated combined phase errors according to at least one of the estimated combined signal-to-noise ratio for the antennas or the estimated power of the transmitted symbol.

85. The receiver of claim 83, wherein the phase error estimator selects subcarriers having energy levels above a threshold, and uses the selected subcarriers to choose the pairs of subcarriers used to estimate the sampling phase error.

86. The receiver of any of claims 68 to 73, wherein the wireless signals are transmitted according to the IEEE 802.11 a standard.

87. A receiver comprising:
a first antenna that receives an orthogonal frequency division multiplexing (OFDM) wireless signal;
a second antenna that receives the orthogonal frequency division multiplexing (OFDM) wireless signal;
a first fast Fourier transform (FFT) unit that produces a first observation of a transmitted quadrature amplitude modulated (QAM) symbol from the wireless signal received by the first antenna;
a second fast Fourier transform (FFT) unit that produces a second observation of a transmitted quadrature amplitude modulated (QAM) symbol from the wireless signal received by the second antenna;
an equalizer that weights the first observation with a complex-conjugate of a channel response for the first antenna, and weights the second observation with a complex-conjugate of a channel response for the second antenna;
a soft demapper unit that combines the weighted first observation and the weighted second observation to form a combined observation, generates one or more soft decision bits indicative of the transmitted QAM symbol for a real component of the combined observation according to soft demapping rules based on a subset of the transmitted QAM symbol constellation, and generates one or more soft decision bits indicative of the transmitted QAM symbol for an imaginary component of the combined observation according to soft demapping rules based on a subset of the transmitted QAM symbol constellation.

88. The receiver of claim 87, wherein the soft demapping rules are based on a first minimum distance symbol associated with bit 1 and a first minimum distance symbol associated with bit 0.

89. The receiver of claim 87, wherein the minimum distance symbols are constrained to be within a predetermined distance of an inter-bit decision boundary.

90. The receiver of claim 87, wherein the soft demapping rules are based on piecewise linear functions.

91. The receiver of claim 87, wherein the soft demapping rules are based on piecewise linear functions of the real and imaginary components of the combined observation and a combined energy of the channel responses for the multiple antennas.

92. The receiver of claim 91, wherein the soft demapper unit computes one or more of the soft decisions recursively based on previously computed soft decisions.

93. A receiver comprising:
a first antenna that receives an orthogonal frequency division multiplexing (OFDM) wireless signal;
a second antenna that receives the orthogonal frequency division multiplexing (OFDM) wireless signal;
a first fast Fourier transform (FFT) unit that produces a first observation of a transmitted Quadrature amplitude modulated (QAM) symbol from the wireless signal received by the first antenna;

a second fast Fourier transform (FFT) unit that produces a second observation of a transmitted Quadrature amplitude modulated (QAM) symbol from the wireless signal received by the second antenna;

an equalizer that weights the first observation with a complex-conjugate of a channel response for the first antenna, and weights the second observation with a complex-conjugate of a channel response for the second antenna;

a soft demapper unit that combines the weighted first observation and the weighted second observation to form a combined observation, and generates one or more soft decision bits indicative of the transmitted QAM symbol for the combined observation according to soft demapping rules based on a subset of the transmitted QAM symbol constellation; and a phase error estimator that estimates a combined phase error including carrier phase error and sampling phase error for the combined observation using either the transmitted symbol estimated based on the soft decision bits or a predetermined symbol transmitted via a pilot tone.

94. A receiver comprising:

an antenna that receives an orthogonal frequency division multiplexing (OFDM) wireless signal;

a fast Fourier transform (FFT) function unit that produces an observation of a transmitted quadrature amplitude modulated (QAM) symbol from the wireless signal;

an equalizer that weights the observation with a complex-conjugate of a channel response for the antenna; and a soft demapper unit that generates one or more soft decision bits indicative of the transmitted symbol for a real component of the weighted observation according to soft demapping rules based on a subset of the transmitted symbol constellation, and generates one or more soft decision bits indicative of the transmitted symbol for an imaginary component of the weighted observation according to soft demapping rules based on a subset of the transmitted symbol constellation.

95. The receiver of claim 94, wherein the soft demapping rules are based on a first minimum distance symbol associated with bit 1 and a second minimum distance symbol associated with bit 0.

96. The receiver of claim 94, wherein the minimum distance symbols are constrained to be within a predetermined distance of an inter-bit decision boundary.

97. The receiver of claim 94, wherein the soft demapping rules are based on piecewise linear functions.

98. The receiver of claim 94, wherein the soft demapping rules are based on piecewise linear functions of real and imaginary components of the weighted observation and the energy of the channel response.

99. The receiver of claim 94, wherein the soft demapper unit computes one or more of the soft decisions recursively based on previously computed soft decisions.

100. The receiver of any of claims 94–99, further comprising a phase error estimator that estimates a combined phase error including carrier phase error and sampling phase error for the observation using either the transmitted symbol estimated based on the soft decision bits or a predetermined symbol transmitted via a pilot tone.

101. A method comprising applying a soft decision function to generate soft decision bits for a real component of a combined transmitted symbol observation produced from wireless signals received via multiple receive paths, and generate soft decision bits for an imaginary component of a combined transmitted symbol observation produced from wireless signals received via multiple receive paths, wherein the soft decision function defines soft demapping rules based on a subset of the transmitted symbol constellation.

102. The method of claim 101, wherein the soft demapping rules are based on a first minimum distance symbol associated with a first bit encoded in the transmitted symbol and a second minimum distance symbol associated with a second bit in the transmitted symbol.

103. The method of claim 102, wherein the first and second minimum distance symbols are constrained to be within a predetermined distance of an inter-bit decision boundary.

104. The method of claim 101, further comprising receiving the wireless signals via multiple antennas, wherein the soft demapping rules are based on piecewise linear functions of real and imaginary components of the combined observation and a combined energy of the channel responses for the multiple antennas.

105. The method of claim 101, wherein the wireless signals are transmitted according to the IEEE 802.11a standard.

106. A receiver comprising a soft demapper unit that applies a soft decision function to generate soft decision bits for a real component of a combined QAM symbol produced from wireless signals received via multiple receive paths, and generate soft decision bits for an imaginary component of a combined QAM symbol produced from wireless signals received via multiple receive paths, wherein the soft decision function defines soft demapping rules based on a subset of the transmitted symbol constellation.

107. The receiver of claim 106, wherein the soft demapping rules are based on a first minimum distance symbol associated with a first bit encoded in the transmitted symbol and a second minimum distance symbol associated with a second bit in the transmitted symbol.

108. The receiver of claim 107, wherein the first and second minimum distance symbols are constrained to be within a predetermined distance of an inter-bit decision boundary.

109. The receiver of claim 106, further comprising receiving the wireless signals via multiple antennas, wherein the soft demapping rules are based on piecewise linear functions of real and imaginary components of the combined observation and a combined energy of the channel responses for the multiple antennas.

110. The receiver of claim 106, wherein the wireless signals are transmitted according to the IEEE 802.11 a standard.

111. The method of claim 1, further comprising selecting the subset of the transmitted symbol constellation based on a minimum distance from the respective component of the combined observation or an inter-bit decision boundary.

112. The method of claim 10, further comprising selecting the subset of the transmitted symbol constellation based on a minimum distance from the respective component of the combined observation or an inter-bit decision boundary.

113. The method of claim 29, further comprising selecting the subset of the transmitted symbol constellation based on a minimum distance from the respective component of the combined observation or an inter-bit decision boundary.

114. The method of claim 47, further comprising selecting the subset of the transmitted symbol constellation based on a minimum distance from the respective component of the combined observation or an inter-bit decision boundary.

115. The receiver of claim 59, wherein the subset of the transmitted symbol constellation is selected based on a minimum distance from the respective component of the combined observation or an inter-bit decision boundary.

116. The receiver of claim 68, wherein the subset of the transmitted symbol constellation is selected based on a minimum distance from the respective component of the combined observation or an inter-bit decision boundary.

117. The receiver of claim 87, wherein the subset of the transmitted symbol constellation is selected based on a minimum distance from the respective component of the combined observation or an inter-bit decision boundary.

118. The receiver of claim 84, wherein the subset of the transmitted symbol constellation is selected based on a minimum distance from the respective component of the combined observation or an inter-bit decision boundary.

119. The method of claim 101, further comprising selecting the subset of the transmitted symbol constellation based on a minimum distance from the respective component of the combined observation or an inter-bit decision boundary.

120. The receiver of claim 106, wherein the subset of the transmitted symbol constellation is selected based on a minimum distance from the respective component of the combined observation or an inter-bit decision boundary.

121. The method of claim 1, wherein generating one or more soft decision bits includes generating the soft decision bits for the real component and the imaginary component on an alternating basis.

122. The method of claim 10, wherein generating one or more soft decision bits includes generating the soft decision bits for the real component and the imaginary component on an alternating basis.

123. The method of claim 29, wherein generating one or more soft decision bits includes generating the soft decision bits for the real component and the imaginary component on an alternating basis.

124. The method of claim 47, wherein generating one or more soft decision bits includes generating the soft decision bits for the real component and the imaginary component on an alternating basis.

125. The receiver of claim 59, wherein the soft demapper unit generates the soft decision bits for the real component and the imaginary component on an alternating basis.

126. The receiver of claim 68, wherein the soft demapper unit generate the soft decision bits for the real component and the imaginary component on an alternating basis.

127. The receiver of claim 87, wherein the soft demapper unit generates the soft decision bits for the real component and the imaginary component on an alternating basis.

128. The receiver of claim 94, wherein the soft demapper unit generates the soft decision bits for the real component and the imaginary component on an alternating basis.

\* \* \* \* \*

UNITED STATES PATENT AND TRADEMARK OFFICE
CERTIFICATE OF CORRECTION

PATENT NO. : 7,173,990 B2
APPLICATION NO. : 10/141628
DATED : February 6, 2007
INVENTOR(S) : Kim et al.

It is certified that error appears in the above-identified patent and that said Letters Patent is hereby corrected as shown below:

On column 6, line 32, "$b_1b_2..b_M$", should read --$b_1b_2...b_M$--

On column 6, line 34, "$1 \leq 1 \leq M$", should read --$1 \leq l \leq M$--

On column 6, line 40, "$= \ln \sum_{a_i \in A(b_l=1)} \frac{P(a_i/\mathbf{R})}{\sum_{a_j \in A(b_l=0)} P(a_j/\mathbf{R})}$", should read $$-- = \ln \frac{\sum_{a_i \in A(b_l=1)} P(a_i/\mathbf{R})}{\sum_{a_j \in A(b_l=0)} P(a_j/\mathbf{R})} --$$

On column 6, line 55, "$= \ln \sum_{a_i \in A(b_l=1)} \frac{p(\mathbf{R}/a_i)}{\sum_{a_j \in A(b_l=0)} p(\mathbf{R}/a_j)}$", should read $$-- = \ln \frac{\sum_{a_i \in A(b_l=1)} p(\mathbf{R}/a_i)}{\sum_{a_j \in A(b_l=0)} p(\mathbf{R}/a_j)} --$$

On column 7, line 53, "$= \sum_{i=1}^{L} [2 \cdot \mathrm{Re}\{u_i a^*_{\min 1} H_i^*\} - |a_{\min 1} H_i|^2]$", should read $-- = \sum_{i=1}^{L} [2 \cdot \mathrm{Re}\{u_i a_{\min 1}^* H_i^*\} - |a_{\min 1} H_i|^2] --$ On column 7, line 55, "$\sum_{i=1}^{L} [2 \cdot \mathrm{Re}\{u_i a^*_{\min 0} H_i^*\} - |a_{\min 0} H_i|^2]$ should read $-- \sum_{i=1}^{L} [2 \cdot \mathrm{Re}\{u_i a_{\min 0}^* H_i^*\} - |a_{\min 0} H_i|^2] --$ On column 9, line 43, delete "11110 9 11110 9" in Table 2 as it is a duplicate entry On column 11, line 5, add --where--

UNITED STATES PATENT AND TRADEMARK OFFICE
CERTIFICATE OF CORRECTION

PATENT NO. : 7,173,990 B2
APPLICATION NO. : 10/141628
DATED : February 6, 2007
INVENTOR(S) : Kim et al.

It is certified that error appears in the above-identified patent and that said Letters Patent is hereby corrected as shown below:

On column 14, line 48; "$-N/2 \leqq n \leqq N/2$", should read -- $-N/2 \leq n \leq N/2$ --

On column 14, line 49, "$1 \leqq i \leqq L$", should read -- $1 \leq i \leq L$ --

On column 19, line 12, "angle $(u_{i,n})$-angle$(H_{i,n})$-angle$(S_n) \leqq$ angle$(u_{i,m})$-angle", should read -- $angle\ (u_{i,n})\text{-}angle(H_{i,n})\text{-}angle(S_n) \leq angle(u_{i,m})\text{-}angle$ --

On column 19, line 16, "angle $(u_{i,n})$-angle$(S_n) \leqq$ angle$(u_{i,m})$-angle$(S_m)$", should read -- $angle\ (u_{i,n})\text{-}angle(S_n) \leq angle(u_{i,m})\text{-}angle(S_m)$ --

On column 19, line 20, "angle $(u_{i,n}) \leqq$ angle$(u_{i,m})$", should read -- $angle\ (u_{i,n}) \leq angle(u_{i,m})$ --

Signed and Sealed this

Fourth Day of September, 2007

JON W. DUDAS
*Director of the United States Patent and Trademark Office*